(12) United States Patent
Ito et al.

(10) Patent No.: US 12,440,431 B2
(45) Date of Patent: *Oct. 14, 2025

(54) COSMETIC COMPRISING ULTRAVIOLET WAVELENGTH CONVERSION SUBSTANCE

(71) Applicant: Shiseido Company, Ltd., Tokyo (JP)

(72) Inventors: Ryoya Ito, Tokyo (JP); Kouichi Nagai, Tokyo (JP); Renaud Gillet, Tokyo (JP); Shiho Iwami, Tokyo (JP); Kazuyuki Miyazawa, Tokyo (JP); Tetsuya Kanemaru, Tokyo (JP); Bianca McCarthy, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 779 days.

This patent is subject to a terminal disclaimer.

(21) Appl. No.: 17/601,704

(22) PCT Filed: Apr. 3, 2020

(86) PCT No.: PCT/JP2020/015425
§ 371 (c)(1),
(2) Date: Oct. 5, 2021

(87) PCT Pub. No.: WO2020/204193
PCT Pub. Date: Oct. 8, 2020

(65) Prior Publication Data
US 2022/0202667 A1 Jun. 30, 2022

(30) Foreign Application Priority Data

Apr. 5, 2019 (JP) .................................. 2019-072750
Dec. 27, 2019 (JP) .................................. 2019-239802

(51) Int. Cl.
| | |
|---|---|
| A61K 8/27 | (2006.01) |
| A61K 8/29 | (2006.01) |
| A61K 8/49 | (2006.01) |
| A61K 8/99 | (2017.01) |
| A61Q 17/04 | (2006.01) |
| A61Q 19/08 | (2006.01) |

(52) U.S. Cl.
CPC ................. *A61K 8/27* (2013.01); *A61K 8/29* (2013.01); *A61K 8/4913* (2013.01); *A61K 8/99* (2013.01); *A61Q 17/04* (2013.01); *A61Q 19/08* (2013.01); *A61K 2800/522* (2013.01)

(58) Field of Classification Search
None
See application file for complete search history.

(56) References Cited

U.S. PATENT DOCUMENTS

| | | | |
|---|---|---|---|
| 2,613,206 A | 10/1952 | Caldwell | |
| 3,577,537 A | 5/1971 | Howe | |
| 4,374,796 A | 2/1983 | Ogasawara et al. | |
| 5,221,534 A | 6/1993 | Lauriers et al. | |
| 5,316,767 A | 5/1994 | Hara et al. | |
| 5,612,324 A * | 3/1997 | Guang Lin | A61K 8/368 |
| | | | 514/159 |
| 5,998,789 A | 12/1999 | Kovalsky et al. | |
| 6,207,174 B1 | 3/2001 | Hineno et al. | |
| 6,972,129 B1 | 12/2005 | Ogawa et al. | |
| 2002/0106518 A1 | 8/2002 | Inaki et al. | |
| 2003/0180535 A1 | 9/2003 | Horino et al. | |
| 2005/0158257 A1 | 7/2005 | Ogawa et al. | |
| 2006/0140889 A1 | 6/2006 | Houtzager et al. | |
| 2006/0275231 A1 | 12/2006 | Dumousseaux | |
| 2007/0141018 A1 | 6/2007 | Courtois et al. | |
| 2007/0154426 A1 | 7/2007 | Hansen et al. | |
| 2007/0243520 A1 | 10/2007 | Fujimura et al. | |
| 2008/0183250 A1 | 7/2008 | Tanojo et al. | |
| 2008/0213198 A1 | 9/2008 | Lintner et al. | |
| 2009/0220627 A1 | 9/2009 | Hasegawa et al. | |
| 2009/0270298 A1 | 10/2009 | Compain | |
| 2010/0003202 A1 | 1/2010 | Matsumoto et al. | |
| 2010/0228181 A1 | 9/2010 | Laboureau et al. | |
| 2010/0247693 A1 | 9/2010 | Marini | |
| 2010/0272663 A1 * | 10/2010 | Pierre | A61K 8/90 |
| | | | 514/558 |
| 2011/0033400 A1 | 2/2011 | Ehlis et al. | |
| 2011/0046538 A1 * | 2/2011 | Laboureau | A61Q 7/00 |
| | | | 604/20 |
| 2012/0328719 A1 | 12/2012 | Iriyama et al. | |
| 2013/0079368 A1 | 3/2013 | Omura et al. | |
| 2015/0239941 A1 | 8/2015 | Ecosystem | |
| 2016/0160347 A1 | 6/2016 | Liu et al. | |
| 2016/0338943 A1 | 11/2016 | Saxena et al. | |
| 2017/0009024 A1 | 1/2017 | Kudo | |
| 2017/0027827 A1 | 2/2017 | Ota et al. | |
| 2017/0042312 A1 | 2/2017 | Shih | |

(Continued)

FOREIGN PATENT DOCUMENTS

| | | |
|---|---|---|
| CN | 102048654 A | 5/2011 |
| CN | 105055251 A | 11/2015 |

(Continued)

OTHER PUBLICATIONS

U.S. Appl. No. 17/601,252, filed Apr. 3, 2020, Ito et al.
U.S. Appl. No. 17/601,262, filed Apr. 3, 2020, Yoshida et al.
U.S. Appl. No. 17/601,333, filed Apr. 3, 2020, Sugihara et al.
U.S. Appl. No. 17/601,317, filed Apr. 3, 2020, Ito et al.
U.S. Appl. No. 17/601,347, filed Apr. 3, 2020, Okuyama et al.
U.S. Appl. No. 17/601,331, filed Apr. 3, 2020, Okuyama et al.
U.S. Appl. No. 17/601,341, filed Apr. 1, 2020, Miyazawa et al.
Feng Juqin et al., "Chinese Cosmetic Therapy Techniques," China Press of Traditional Chinese Medicine, Aug. 31, 2014, p. 35-36.

(Continued)

*Primary Examiner* — Melissa S Mercier
(74) *Attorney, Agent, or Firm* — Foley & Lardner LLP

(57) ABSTRACT

There is provided a novel composition containing a UV wavelength conversion substance, a dispersant, a UV absorber and/or a UV scattering agent, and an oil content, wherein the blending amount of the dispersant is 1% by weight or more.

9 Claims, 5 Drawing Sheets

(56) References Cited

U.S. PATENT DOCUMENTS

| | | |
|---|---|---|
| 2017/0065498 A1 | 3/2017 | Gershon et al. |
| 2017/0172888 A1 | 6/2017 | Tashiro et al. |
| 2018/0311117 A1 | 11/2018 | Zeng et al. |
| 2020/0093712 A1 | 3/2020 | Uchiyama et al. |
| 2020/0113793 A1 | 4/2020 | Sako et al. |
| 2020/0289400 A1 | 9/2020 | Nakajima et al. |
| 2020/0297598 A1 | 9/2020 | Koizumi et al. |
| 2020/0308482 A1 | 10/2020 | Ishikawa et al. |
| 2021/0228472 A1 | 7/2021 | Osawa et al. |
| 2022/0175639 A1 | 6/2022 | Okuyama et al. |

FOREIGN PATENT DOCUMENTS

| | | | |
|---|---|---|---|
| CN | 106309272 A | 1/2017 | |
| CN | 113631144 A | 11/2021 | |
| EP | 0 905 206 A2 | 3/1999 | |
| EP | 1 090 974 A1 | 4/2001 | |
| EP | 1 296 639 A1 | 4/2003 | |
| GB | 0 639 086 A | 6/1950 | |
| JP | 57-060004 B2 | 12/1982 | |
| JP | 61-054766 B2 | 11/1986 | |
| JP | 62-000408 A | 1/1987 | |
| JP | 03-284613 A | 12/1991 | |
| JP | 05-117127 A | 5/1993 | |
| JP | 07-206651 A | 8/1995 | |
| JP | 09-030926 A | 2/1997 | |
| JP | 10-265321 A | 10/1998 | |
| JP | 11-092688 A | 4/1999 | |
| JP | 11-193207 A | 7/1999 | |
| JP | 11-222421 A | 8/1999 | |
| JP | 11-236315 A | 8/1999 | |
| JP | 2001-335442 A | 12/2001 | |
| JP | 2002-146238 A | 5/2002 | |
| JP | 2002-212033 A | 7/2002 | |
| JP | 3303942 B | 7/2002 | |
| JP | 2003-061229 A | 2/2003 | |
| JP | 2003-212745 A | 7/2003 | |
| JP | 2003-261421 A | 9/2003 | |
| JP | 3608778 B2 | 1/2005 | |
| JP | 2005-041861 A | 2/2005 | |
| JP | 2006-022050 A | 1/2006 | |
| JP | 2006-282593 A | 10/2006 | |
| JP | 2006-316065 A | 11/2006 | |
| JP | 2007-055990 A | 3/2007 | |
| JP | 2007-056035 A | 3/2007 | |
| JP | 2007-084508 A | 4/2007 | |
| JP | 2007-517770 A | 7/2007 | |
| JP | 2008-037844 A | 2/2008 | |
| JP | 4048420 B | 2/2008 | |
| JP | 2008-189642 A | 8/2008 | |
| JP | 2009-137900 A | 6/2009 | |
| JP | 2009-209093 A | 9/2009 | |
| JP | 2010-090113 A | 4/2010 | |
| JP | 4453995 B2 | 4/2010 | |
| JP | 2010195694 A * | 9/2010 | |
| JP | 2010-533689 A | 10/2010 | |
| JP | 2011-042624 A | 3/2011 | |
| JP | 4677250 B | 4/2011 | |
| JP | 2011-102270 A | 5/2011 | |
| JP | 2012-167088 A | 9/2012 | |
| JP | 2012-201660 A | 10/2012 | |
| JP | 2013-501104 A | 1/2013 | |
| JP | 2013-177356 A | 9/2013 | |
| JP | 2015-074623 A | 4/2015 | |
| JP | 2015-120682 A | 7/2015 | |
| JP | 2015-172017 A | 10/2015 | |
| JP | 2016-500052 A | 1/2016 | |
| JP | 2016-069325 A | 5/2016 | |
| JP | 2017-036277 A | 2/2017 | |
| JP | 2017-088719 A | 5/2017 | |
| JP | 2017-122075 A | 7/2017 | |
| JP | 2017-122076 A | 7/2017 | |
| JP | 2017-155062 A | 9/2017 | |
| JP | 2017-214565 A | 12/2017 | |
| JP | 2018-076277 A | 5/2018 | |
| JP | 2018-076308 A | 5/2018 | |
| JP | 2018-512064 A | 5/2018 | |
| JP | 2018-100258 A | 6/2018 | |
| JP | 6361416 B | 7/2018 | |
| JP | 2018-131422 A | 8/2018 | |
| JP | 6424656 B2 | 11/2018 | |
| JP | 2019-043920 A | 3/2019 | |
| JP | 2019-108303 A | 7/2019 | |
| JP | 2019-137623 A | 8/2019 | |
| JP | 2019-167330 A | 10/2019 | |
| JP | 2019-178126 A | 10/2019 | |
| JP | 2020-066599 A | 4/2020 | |
| JP | 2020-183356 A | 11/2020 | |
| KR | 10-2019-0005369 A | 1/2019 | |
| TW | 201216997 A1 | 5/2012 | |
| WO | WO-02/00190 A1 | 1/2002 | |
| WO | WO-03/099039 A1 | 12/2003 | |
| WO | WO-2005/034862 A2 | 4/2005 | |
| WO | WO-2011/014783 A1 | 2/2011 | |
| WO | WO-2015/166895 A1 | 11/2015 | |
| WO | WO-2016/068300 A1 | 5/2016 | |
| WO | WO-2016/142129 | 9/2016 | |
| WO | WO-2016/160347 A2 | 10/2016 | |
| WO | WO-2017/069157 A1 | 4/2017 | |
| WO | WO-2017142057 A1 * | 8/2017 | ............... A61K 8/19 |
| WO | WO-2018/004006 A1 | 1/2018 | |
| WO | WO-2018/062469 A1 | 4/2018 | |
| WO | WO-2018/117117 A1 | 6/2018 | |
| WO | WO-2019/032059 A1 | 2/2019 | |
| WO | WO-2019/065963 A1 | 4/2019 | |

OTHER PUBLICATIONS

Zhu Ping et al., "LED Light Therapy Application and Development," China Science and Technology Press, Aug. 31, 2017, p. 41.
Sakai Chemical Industry Co., Ltd., Inorganic fluorescent material that emits "beautiful skin color", Lumate, Fragrance Journal, 2018, 46(8):66-67, with English translation.
U.S. Appl. No. 17/796,577, filed Jan. 29, 2021, Miyazawa et al.
U.S. Appl. No. 17/796,578, filed Jan. 29, 2021, Miyazawa et al.
U.S. Appl. No. 17/796,580, filed Jan. 29, 2021, Miyazawa et al.
U.S. Appl. No. 17/796,584, filed Jan. 29, 2021, Miyazawa et al.
Kato, Toshimitsu, "Utilization of Spirulina blue colorant: Especially for frozen desserts and drinks," New Food Industry, 1987, 29(3):17-21, with English machine translation.
Sakai Chemical Industry Co., Ltd., "Shining new cosmetic raw material, Inorganic fluorescent powder LUMATE series," Fragrance Journal, Jul. 2015, 62-63, with English machine translation.
"Modern Cosmetic Science and Technology (vol. 2)," edited by Qiu Bingyi et al., China Light Industry Press Ltd., Mar. 2016, pp. 1414 and 1415, with English machine translation.
Du et al., "Visible-to-Ultraviolet Light Conversion: Materials and Applications," Advanced Photonics Research, 2021, 2(2000213):1-20.
Eriksen, Niels T., "Production of phycocyanin—a pigment with applications in biology, biotechnology, foods and medicine," Applied Microbiology and Biotechnology, 2008, 80(1):1-14.
Hatano et al., "Monolithic wavelength converter for ultraviolet light by use of a $GdxY1-xCa40(BO3)3$ crystal," Applied Optics, Dec. 10, 2005, 44(35):7651-7658.
Jeong et al., "Self-Assembling Nanospheres of Hydrophobized Pullulans in Water," Drug Development and Industrial Pharmacy, 1999, 25(8):917-927.
Translation of Yumiko et al. WO2017142057. Published Aug. 24, 2017. Human-assisted machine translation by STIC Translation Service Center provided to the USPTO. Provided on Sep. 12, 2024. (Year:2017).
Hui et al., "Study on Fluorescence Spectra of B Vitamins," International Conference on Mechanics, Materials and Structural Engineering (ICMMSE 2016), 160-165.
Invitrogen, Phycobiliproteins, 2009, 6 pages.
Ling et al., "Home Physical Therapy for Common Diseases," Heilongjiang Science and Technology Press, 1st Ed., Jan. 2002, 97-98, with English machine translation.
Machine translation of WO 2018004006A1, (Year: 2018) 28 pages.

(56) References Cited

OTHER PUBLICATIONS

Translation of Kawai et al. WO2017142057. Published Aug. 24, 2017. Human-assisted machine translation by STIC Translation Service Center provided to the USPTO. Provided on Sep. 12, 2024. (Year: 2017).

Vinck et al., "Increased fibroblast proliferation induced by light emitting diode and low power laser irradiation," Lasers Med. Sci., 2003, 18:95-99.

Estrada-Urbina et al., "Nanoscale Zinc Oxide Particles for Improving the Physiological and Sanitary Quality of a Mexican Landrace of Red Maize." Nanomaterials, Apr. 17, 2018, 8(247):1-12.

Tsai et al., "Dispersion of Titanium Oxide Nanoparticles in Aqueous Solution with Anionic Stabilizer via Ultrasonic Wave," Journal of Nanoparticles, Nov. 24, 2016, vol. 2016; Article ID 6539581, 1-9.

Wang et al., "Photoprotection in the Era of Nanotechnology," Seminars in Cutaneous Medicine and Surgery, Dec. 2011, 30(4):210-213.

Dejsungkranont et al., "Enhancement of antioxidant activity of C-phycocyanin of Spirulina powder treated with supercritical fluid carbon dioxide," Agriculture and Natural Resources, 2017, 51:347-354.

\* cited by examiner

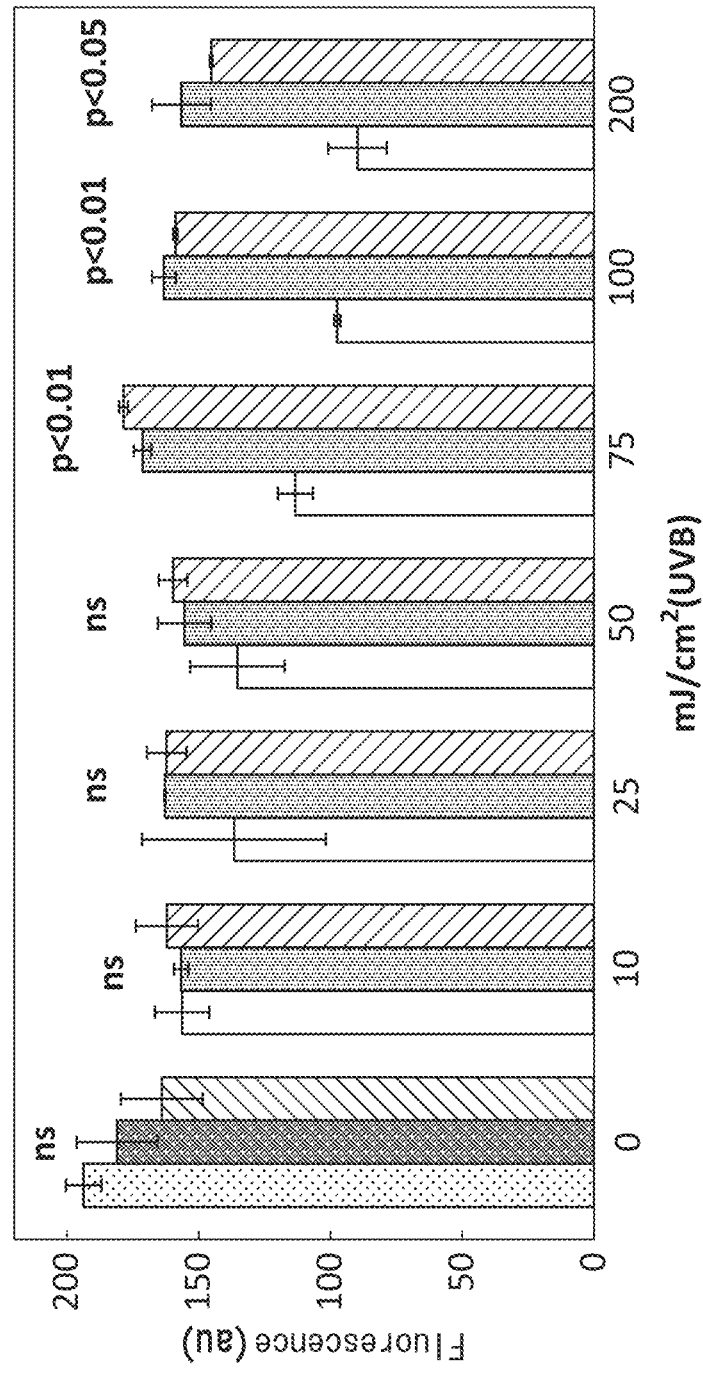

COSMETIC COMPRISING ULTRAVIOLET WAVELENGTH CONVERSION SUBSTANCE

CROSS-REFERENCE TO RELATED APPLICATIONS

This application is the U.S. National Stage of PCT/JP2020/015425, filed Apr. 3, 2020, which claims priority to JP 2019-072750, filed Apr. 5, 2019 and JP 2019-239802, filed Dec. 27, 2019.

FIELD

The present invention relates to a composition having a cell activation action and comprising a UV wavelength conversion substance.

BACKGROUND

Ultraviolet is considered to generate free radicals in vivo and thereby cause oxidation of sebum and damage to cellular DNA. Examples of the damage caused by ultraviolet to skin include adverse effects such as skin cancer, photoaging, spots, wrinkles, and inflammation. These are undesirable from a health and beauty perspective. Although ultraviolet has been used for the purpose of sterilization, it is currently focused on protection from rather than active use of ultraviolet in consideration of the balance with harmful effects caused by ultraviolet.

Thus, many measures have been taken to protect skin from ultraviolet. Examples thereof include use of sunscreens, indoor activities avoiding sunlight, and use of UV-cut hats or clothing, and ultraviolet cut films.

For example, PTL 11 describes an oil-based fluorescent cosmetic containing a fluorescent zinc oxide in the Examples, but does not describe a UV wavelength conversion substance in which a dispersant concentration is as low as 0.8% and which is for bringing about a cell activation effect.

CITATION LIST

Patent Literature

[PTL 1] Japanese Registered Patent Publication No. 6424656
[PTL 2] Japanese Registered Patent Publication No. 6361416
[PTL 3] WO 2018/004006
[PTL 4] Japanese Unexamined Patent Publication (Kokai) No. 2018-131422
[PTL 5] Japanese Unexamined Patent Publication (Kokai) No. 5-117127
[PTL 6] Japanese Registered Patent Publication No. 4048420
[PTL 7] Japanese Registered Patent Publication No. 4677250
[PTL 8] Japanese Registered Patent Publication No. 3303942
[PTL 9] Japanese Unexamined Patent Publication (Kokai) No. 2017-88719
[PTL 10] WO 2018/117117
[PTL 11] Japanese Unexamined Patent Publication (Kokai) No. 2017-122076

SUMMARY

Technical Problem

An object of the present invention is to provide a novel composition having a cell activation action utilizing ultraviolet.

Solution to Problem

The present inventors have conducted intensive studies so that ultraviolet can be effectively used for skin. As a result, the present inventors have conceived of a novel composition having an excellent cell activation action and containing a UV wavelength conversion substance.

The present application provides the following inventions.

(1) A composition comprising (A) a UV wavelength conversion substance, (B) a dispersant, (C) a UV absorber and/or a UV scattering agent, and (D) an oil content, wherein the blending amount of the (B) dispersant is 1% by weight or more.
(2) The composition according to (1), wherein the (A) UV wavelength conversion substance comprises an inorganic UV wavelength conversion substance.
(3) The composition according to (2), wherein the inorganic UV wavelength conversion substance comprises a zinc oxide phosphor and/or a magnesium titanate phosphor.
(4) The composition according to (1), wherein the (A) UV wavelength conversion substance comprises an organic UV wavelength conversion substance.
(5) The composition according to (4), wherein the organic UV wavelength conversion substance comprises one or more selected from the group consisting of phycocyanin, phycoerythrocyanin, phycoerythrin, vitamin K, vitamin B1, vitamin B2, vitamin B2 derivatives, vitamin B6, vitamin B12, folic acid, salicylic acid, gardenia color, capsicum color, capsicum extract, paprika color, perilla color, and red cabbage color.
(6) The composition according to any one of (1) to (5), comprising an inorganic UV wavelength conversion substance and an organic UV wavelength conversion substance as the (A) UV wavelength conversion substance.
(7) A composition comprising (A') one or more selected from the group consisting of a zinc oxide phosphor, a magnesium titanate phosphor, phycocyanin, phycoerythrocyanin, phycoerythrin, vitamin K, vitamin B1, vitamin B2, vitamin B2 derivatives, vitamin B6, vitamin B12, folic acid, salicylic acid, gardenia color, capsicum color, capsicum extract, paprika color, perilla color, and red cabbage color, (B) a dispersant, (C) a UV absorber and/or a UV scattering agent, and (D) an oil content, wherein the blending amount of the (B) dispersant is 1% by weight or more.
(8) The composition according to any one of (1) to (7), wherein the (B) dispersant comprises one or more selected from the group consisting of PEG-10 dimethicone, bis-butyldimethicone polyglyceryl-3, PEG-9 polydimethylpolysiloxy ethyl dimethicone, lauryl PEG-9 polydimethyl polysiloxy ethyl dimethicone, cetyl PEG/PPG-10/1 dimethicone, isostearic acid, diisostearic acid polyglyceryl-2, carboxydecyl trisiloxane, PEG-12 dimethicone, and polyoxyethylene sorbitan monostearate.

(9) The composition according to any one of (1) to (8), comprising one or more powders selected from the group consisting of polymethyl methacrylate, silica, talc, starch, and polyurethane.

(10) The composition according to any one of (1) to (9), which is a water-in-oil type composition.

(11) The composition according to any one of (1) to (10), which is a sunscreen cosmetic.

(12) The composition according to any one of (1) to (11), which exhibits a fluorescence intensity increasing effect.

(13) The composition according to any one of (1) to (12), which exhibits a cell activation effect.

Advantageous Effect of Invention

The UV wavelength conversion substance of the present invention is suitable for effectively utilizing ultraviolet to activate skin cells and can exhibit a preferable effect on skin, and the constituent composition of the composition of the present invention is suitable so that the UV wavelength conversion substance converts ultraviolet to visible light (fluorescence). Conventionally, since ultraviolet is not preferable for skin, it is a technical common knowledge in this field to take measures to avoid exposing skin to ultraviolet as much as possible. However, the present invention is based on the knowledge that conversely a UV wavelength conversion substance utilizes ultraviolet to activate cells and thereby provide a preferable action on skin, and is surprising. Thus, the composition of the present invention may lead to an improvement in the quality of life, such that even those who have avoided ultraviolet as much as possible for a reason of beauty or health may feel like going out actively.

BRIEF DESCRIPTION OF DRAWINGS

FIG. 5 shows the cell activity when irradiating cells having cell activity temporarily reduced in Experiment 3 with UV using C-phycocyanin as relative fluorescence intensity (au) (P test).

DESCRIPTION OF EMBODIMENTS

Figure 1:
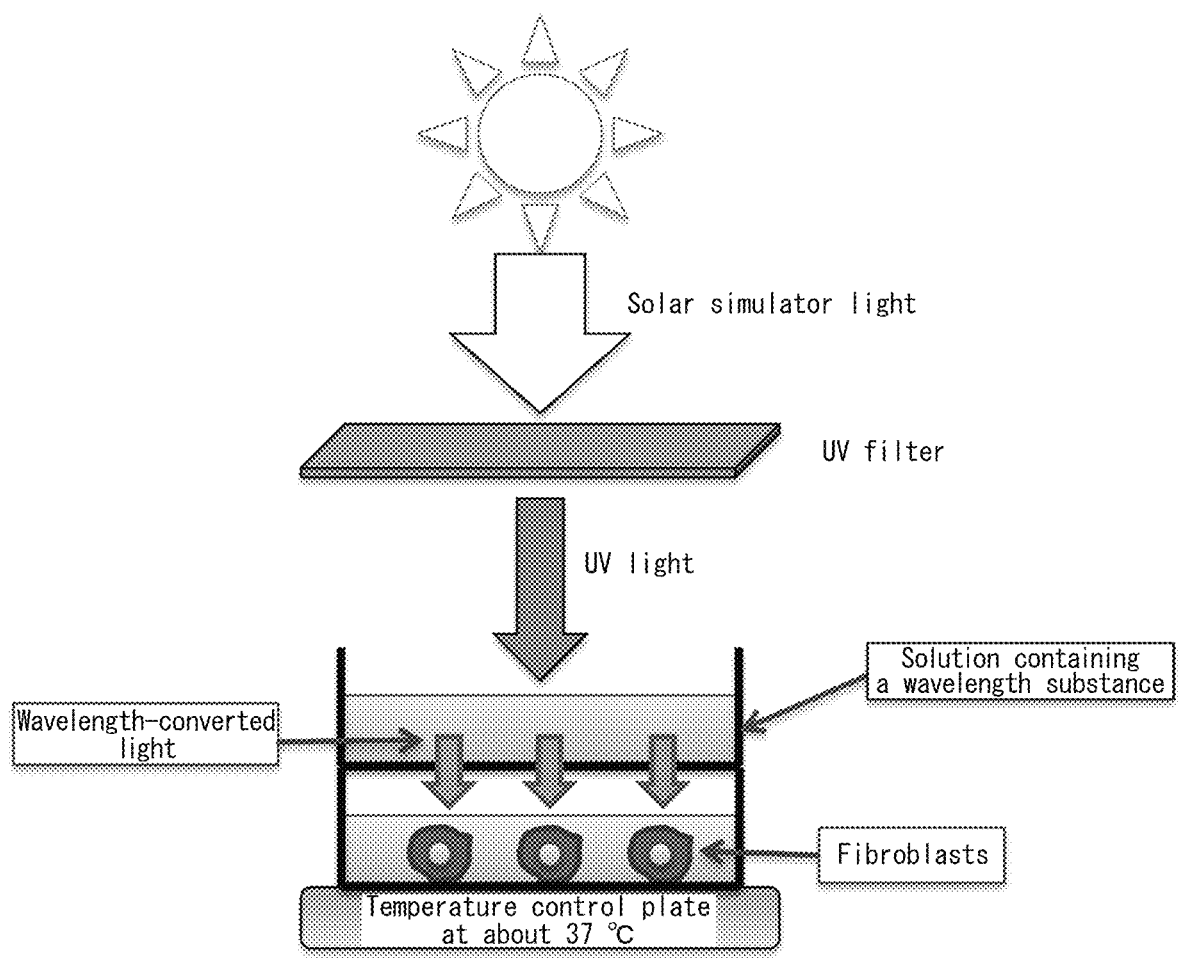
FIG. 1 is a schematic diagram of Experiments 1 and 2.

The present invention will be described below in detail with reference to specific embodiments. However, the present invention is not limited to the following embodiments, and can be carried out in any embodiments without departing from the spirit of the present invention.

All of the patent publications, unexamined patent publications, and non-patent literature cited in the present disclosure are incorporated by reference in their entirety into the present disclosure for all purposes.

In the present disclosure, "to" when applied to numerical values refers to a range of values that fall within a range that is greater than or equal to a defined reference value and less than or equal to a defined reference value.

(A) UV Wavelength Conversion Substance

The composition of the present invention contains a UV wavelength conversion substance as an active component. The phrase "UV wavelength conversion substance" refers to a substance which converts the wavelength of ultraviolet contained in incident light to outgoing light with a wavelength longer than the wavelength of ultraviolet. The phrase "organic UV wavelength conversion substance" refers to a UV wavelength conversion substance which is an organic compound, and the phrase "inorganic UV wavelength conversion substance" refers to a UV wavelength conversion substance which is an inorganic compound.

The ultraviolet may contain UVA, UVB, or UVC. In one embodiment, the ultraviolet is light having a peak wavelength of 200 nm to 400 nm. Further, incident light, for example, sunlight, may contain ultraviolet. Furthermore, the incident light may be ultraviolet or artificially generated ultraviolet may be used.

The outgoing light emitted from the UV wavelength conversion substance has a longer wavelength than ultraviolet and has a peak wavelength of preferably 500 nm to 700 nm. The outgoing light may have one or more peaks, for example, but not limited to, at 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, or within any range therebetween or may be red light, orange light, green light, or blue light. In one embodiment, the main wavelength exhibited by the light emitted from the UV wavelength conversion substance when excited by 200 nm to 400 nm excitation light is 500 nm to 700 nm.

Examples of the UV wavelength conversion substance include the following components: phycobiliproteins such as phycocyanin (allophycocyanin, C-phycocyanin, R-phycocyanin), phycoerythrocyanin, phycoerythrin (B-phycoerythrin, b-phycoerythrin, C-phycoerythrin, R-phycoerythrin); natural or synthetic components such as vitamin A, β-carotene, vitamin K, vitamin B1, vitamin B2, vitamin B6, vitamin B12, folic acid, niacin, salicylic acid, lycopene, capsicum extract, capsicum color, paprika color, gardenia color, safflower color, turmeric color, cochineal color, perilla color, red cabbage color, flavonoid, carotenoid, quinoid, porphyrins, anthocyanins, and polyphenols; colors such as Red No. 401, Red No. 227, Red No. 504, Red No. 218, Orange No. 205P, Yellow No. 4, Yellow No. 5, Green No. 201, pyranine conc., Blue No. 1, 2,4-diaminophenoxyethanol hydrochloride, Alizuline Purple SS, Purple No. 401, Black No. 401, Herindon pink, Yellow No. 401, Benzidine yellow G, Blue No. 404, Red No. 104, and meta-aminophenol; phosphors of an inorganic compound doped to exhibit a fluorescence property, such as the blue phosphor containing an amorphous silica particle, cerium, and phosphorus and/or magnesium described in Japanese Registered Patent Publication No. 6424656, the red phosphor containing a europium-activated compound of a mixed crystal of an alkaline earth metal sulfide and a gallium compound described in Japanese Registered Patent Publication No. 6361416; the zinc oxide phosphor described in WO 2018/004006; the zinc oxide phosphor described in Japanese Unexamined Patent Publication (Kokai) No. 2018-131422; and the inorganic phosphor described in Japanese Unexamined Patent Publication (Kokai) No. 5-117127 (hereinafter, a phosphor derived from zinc oxide is referred to as a "zinc oxide phosphor"). In one embodiment, the inorganic phosphor is one or more phosphors selected from phosphors of zinc oxide represented by ZnO:Zn, $Zn_{1+z}$, or $ZnO_{1-x}$, doped with a sulfide and/or a sulfate, such as zinc sulfide and zinc sulfate, described in WO 2018/004006; magnesium titanate phosphors of a magnesium titanate such as $MgTiO_3$ or $Mg_2TiO_4$ doped with manganese (hereinafter referred to as magnesium titanate is referred to as a "magnesium titanate phosphor"); and calcium phosphate phosphors of a calcium phosphate such as $Ca(H_2PO_4)_2$, $CaHPO_4$, or $Ca_3(PO_4)_2$ doped with cerium.

Further, the inorganic UV wavelength conversion substance which is an inorganic phosphor may be subjected to a surface treatment. Examples of the surface treatment include a silane compound treatment (octyltriethoxysilane), a silicone compound treatment, a fluorine-modified silicone compound treatment, a fluorine compound treatment, a higher fatty acid treatment (stearic acid, etc.), a higher alcohol treatment, a fatty acid ester treatment, a metal soap treatment, an amino acid treatment, and an alkyl phosphate treatment.

UV wavelength conversion substance may be obtained by a method of extraction from natural products such as animals, plants, and algae or an artificial method such as chemical synthesis. For example, phycobiliproteins may be prepared from blue-green algae such as *Spirulina platensis*, red algae such as *Porphyridium cruentum*, and other algae by the extraction method described in, for example, Japanese Registered Patent Publication No. 4048420, Japanese Registered Patent Publication No. 4677250, or Japanese Registered Patent Publication No. 3303942. Zinc oxide phosphors may be produced by the method described in, for example, WO 2018/004006, Japanese Unexamined Patent Publication (Kokai) No. 2018-131422, or Japanese Unexamined Patent Publication (Kokai) No. 5-117127. Magnesium titanate phosphors may be produced by the method described in Japanese Unexamined Patent Publication (Kokai) No. 2017-88719. Calcium phosphate phosphor may be produced by the method described in WO 2018/117117.

These UV wavelength conversion substances may consist of or contain these exemplified components, which may be used alone or in combination of two or more, as long as the wavelength conversion effect of the invention is not impaired. For example, to the phycobiliprotein or inorganic phosphor, there may be added another wavelength conversion substance such as vitamin B (vitamin B1, vitamin B2, vitamin B6, or vitamin B12) to aim for a synergistic effect. Note that these components are merely examples and any substance which can bring about a wavelength conversion effect can be used in the present invention.

Any derivative of vitamin B2, which is a UV wavelength conversion substance, may be used as long as the derivative is a UV wavelength conversion substance. Examples of the vitamin B2 derivatives include riboflavin acetate ester, riboflavin butyrate, riboflavin phosphate (may be a sodium or mono-diethanolamine salt), flavin mononucleotide, flavin adenine dinucleotide, riboflavin tetrabutyrate, and riboflavin tetranicotinate. Derivatives of lixoflavin, which is a stereoisomer of riboflavin, may be used.

The content of the UV wavelength conversion substance in the composition of the present invention is not particularly limited as long as the wavelength conversion effect of the present invention is not impaired. The content can be appropriately determined in accordance with the type of the UV wavelength conversion substance or the application of the composition containing the UV wavelength conversion substance. The range thereof is not limited and may be, for example, 0.001 to 99.99% by weight, 0.001 to 10% by weight, 0.01 to 99.99% by weight, 0.01 to 10% by weight, 0.1% to 99.9% by weight, or 0.1 to 10% by weight.

As one aspect of the present invention, the UV wavelength conversion substance of the composition contains a zinc oxide phosphor. In the composition of the present invention, preferably, the content of a zinc oxide phosphor relative to the total of the composition is 0.10% by weight or more, preferably 1.0% by mass or more, more preferably 1.5% by weight or more, or even more preferably 2% by weight or more, and 20% by weight or less, preferably 15% by weight or less, more preferably 10% by weight or less, or even more preferably 5% by weight or less. The content relative to the total of the composition is 0.01 to 99.99% by weight, 0.1 to 99.9% by weight, 0.1 to 50% by weight, 0.1 to 40% by weight, 0.1 to 30% by weight, 0.1 to 20% by weight, 0.1 to 10% by weight, or 1 to 10% by weight.

As one aspect of the present invention, the UV wavelength conversion substance of the composition contains a magnesium titanate phosphor. In the composition of the present invention, preferably, the content of a magnesium titanate phosphor relative to the total of the composition is 0.1% by weight or more, preferably 1.0% by mass or more, more preferably 1.5% by weight or more, or even more preferably 2% by weight or more, and 20% by weight or less, preferably 15% by weight or less, more preferably 10% by weight or less, or even more preferably 5% by weight or less. The content relative to the total of the composition is 0.01 to 99.99% by weight, 0.1 to 99.9% by weight, 0.1 to 50% by weight, 0.1 to 40% by weight, 0.1 to 30% by weight, 0.1 to 20% by weight, 0.5 to 10% by weight, 0.1 to 10% by weight, or 1 to 10% by weight.

As one aspect of the present invention, the UV wavelength conversion substance of the composition contains phycocyanin. In the composition of the present invention, preferably, the content of a phycocyanin relative to the total of the composition is 0.00001% by weight or more, preferably 0.0001% by mass or more, and 20% by weight or less, preferably 15% by weight or less, more preferably 10% by weight or less, or even more preferably 5% by weight or less. The content relative to the total of the composition is 0.00001 to 99.99% by weight, 0.0001 to 99.9% by weight, 0.0001 to 50% by weight, 0.0001 to 40% by weight, 0.0001 to 30% by weight, 0.0001 to 20% by weight, 0.0001 to 10% by weight, 0.0001 to 5% by weight, 0.001 to 5% by weight, 0.01 to 5% by weight, 0.05 to 5% by weight, 0.1 to 5% by weight, 0.1 to 3% by weight, or 0.1 to 1% by weight.

As one aspect of the present invention, the UV wavelength conversion substance of the composition contains vitamin B2. In the composition of the present invention, preferably, the content of vitamin B2 relative to the total of the composition is 0.000010% by weight or more, preferably 0.0001% by weight or more, and 20% by weight or less, preferably 15% by weight or less, more preferably 10% by weight or less, or even more preferably 5% by weight or less. The content relative to the total of the composition is 0.00001 to 99.99% by weight, 0.0001 to 99.9% by weight, 0.0001 to 50% by weight, 0.0001 to 40% by weight, 0.0001 to 30% by weight, 0.0001 to 20% by weight, 0.0001 to 10% by weight, 0.0001 to 5% by weight, 0.001 to 5% by weight, 0.005 to 5% by weight, 0.01 to 5% by weight, 0.01 to 1% by weight, 0.01 to 0.5% by weight, or 0.01 to 0.10% by weight.

Examples of cell activation include, but are not limited to, promoting metabolism and turnover, improving a function, promoting proliferation, inhibiting oxidation, improving resistance to fatigue and external stimuli, and inhibiting loss of function and activity in cells, such as dermal fibroblasts and/or keratinocytes, of animals including humans. When skin cells are activated, effects such as prevention of or improvement from wrinkles, spots, skin aging, and photoaging can be expected.

The cell activation effect may be measured by measuring, for example, the viability, reducing ability, or proliferation of living cells using AlamarBlue as in the Examples. Any method can be used such as another dye assay, mitochondrial membrane potential-dependent dye assay, intracellular cytochrome c assay, elastase cleavage dye assay, ATP, ADE assay, glycolytic flux and oxygen consumption assay, collagen assay, photoaging assay, collagen glycation assay, inflammatory substances (interleukin 1α, interleukin 8, tumor necrosis factor α) assay, skin barrier function-related protein (corneodesmosin, sphingomyelin phosphodiesterase, filaggrin, involucrin, loricrin, transglutaminase 1, caspase 14) assay, angiogenesis modulator (VEGF-A, ANGPT1) assay, oxidation and/or skin stress-related protein (aromatic hydrocarbon receptor repressor, cytochrome P4501B1, aromatic hydrocarbon receptor repressor, heme oxygenase 1) assay, or hyaluronic acid assay.

The composition of the present invention is suitable for performing the function of a UV wavelength conversion substance and for alleviating, or more positively improving, skin damage when the skin is exposed to ultraviolet by activating cells. Specifically, the composition of the present invention is suitable for collagen production or hyaluronic acid production by fibroblasts and inhibition of damage caused by photoaging and for inhibiting oxidation stress of keratinocytes, enhancing a barrier function, suppressing an inflammatory reaction, and suppressing the glycation of collagen and angiogenesis in skin.

Fluorescence intensity can be measured using a spectrofluorometer by irradiating with ultraviolet a coating film of the composition on the surface of a substrate, as in the Examples. The substrate may be a resin substrate composed of a polymethyl methacrylate (PMMA), nylon, or acrylic plate or an inorganic plate of glass or quartz. For example, a PMMA plate having V-shaped grooves on its surface (also refer to as "S plate": Japanese Registered Patent Publication No. 4453995) can be used. As the fluorescence intensity, a fluorescence value at a specific single wavelength or an integrated value in a specific wavelength region may be used.

One aspect of the composition of the present invention is a composition comprising (A') one or more selected from the group consisting of zinc oxide phosphors, magnesium titanate phosphors, phycocyanin, phycoerythrocyanin, phycoerythrin, vitamin K, vitamin B1, vitamin B2, vitamin B2 derivatives, vitamin B6, vitamin B12, folic acid, salicylic acid, gardenia color, capsicum color, capsicum extract, paprika color, perilla color, and red cabbage color, (B) a dispersant, (C) a UV absorber and/or a UV scattering agent, and (D) an oil content, wherein the blending amount of the (B) dispersant is 1% by weight or more. One aspect of the composition of the present invention is a composition comprising (A') a zinc oxide phosphor, (B) a dispersant, (C) a UV absorber and/or a UV scattering agent, and (D) an oil content, wherein the blending amount of the (B) dispersant is 1% by weight or more. One aspect of the composition of the present invention is a composition comprising (A') a magnesium titanate phosphor, (B) a dispersant, (C) a UV absorber and/or a UV scattering agent, and (D) an oil content, wherein the blending amount of the (B) dispersant is 1% by weight or more. One aspect of the composition of the present invention is a composition comprising (A') phycocyanin, (B) a dispersant, (C) a UV absorber and/or a UV scattering agent, and (D) an oil content, wherein the blending amount of the (B) dispersant is 1% by weight or more. One aspect of the composition of the present invention is a composition comprising (A') vitamin B2, (B) a dispersant, (C) a UV absorber and/or a UV scattering agent, and (D) an oil content, wherein the blending amount of the (B) dispersant is 1% by weight or more.

(B) Dispersant

The composition of the present invention comprises a dispersant. "Dispersant" refers to a substance that can be uniformly dispersed in a water-based or oil-based medium by adsorbing on the surface of particles dispersed in the water phase or oil phase. The dispersant which can be used in the present invention is not particularly limited as long as the function of the UV wavelength conversion substance is not impaired thereby. An oil-based dispersant is preferable, and examples of oil-based dispersants include nonionic surfactants, cationic surfactants, anionic surfactants, silicone-based surfactants, and fatty acids. In the present invention, in particular, the use of a nonionic surfactant, and/or a silicone-based surfactant, and/or a fatty acid which are conventionally used in cosmetics and pharmaceuticals is preferable.

As preferred dispersants which can be contained in the composition of the present invention, PEG-10 dimethicone, bis-butyldimethicone polyglyceryl-3, PEG-9 polydimethylsiloxy ethyl dimethicone, lauryl PEG-9 polydimethyl siloxy ethyl dimethicone, cetyl PEG/PPG-10/1 dimethicone, isostearic acid, diisostearic acid polyglyceryl-2, carboxydecyl trisiloxane, PEG-12 dimethicone, or polyoxyethylene sorbitan monostearate, as well as combinations of two or more of these can be contained.

As preferred examples of dispersants which can be contained in the composition of the present invention, since they enhance the function of the UV wavelength conversion substance, PEG-10 dimethicone, bis-butyldimethicone polyglyceryl-3, PEG-9 polydimethylsiloxy ethyl dimethicone, lauryl PEG-9 polydimethylsiloxy ethyl dimethicone, cetyl PEG/PPG-10/1 dimethicone, isostearic acid, or carboxydecyl trisiloxane, as well as combinations of two or more of these can be contained.

The content of the dispersant in the composition of the present invention is not particularly limited as long as the wavelength conversion effect of the present invention is not impaired thereby, and can be appropriately determined in accordance with the type of the UV wavelength conversion substance or the application of the composition containing the UV wavelength conversion substance. For example, the content may be arbitrary in the range of 0.01 to 99.99% by weight, or 0.1 to 99.9% by weight.

The content of the preferred dispersant in the composition of the present invention is 0.1% by weight or more, preferably greater than 0.5%, 0.8% by mass or more, more preferably 1.0% by mass or more, even more preferably 1.5% by weight or more, or 2% by weight or more, relative to the total of the composition, and is 20% by weight or less, preferably 15% by weight or less, more preferably 10% by weight or less, even more preferably 6% by weight or less, and is 0.01 to 99.99% by weight, 0.1 to 99.9% by weight, 0.1 to 50% by weight, 0.1 to 40% by weight, 0.1 to 30% by weight, 0.1 to 20% by weight, 0.1 to 10% by weight, 0.5 to 10% by weight, 1 to 10% by weight, 1.5 to 10% by weight, or 0.8 to 6% by weight relative to the total of the composition.

As one aspect of the present invention, the dispersant in the composition contains PEG-10 dimethicone, and the content of the dispersant in the composition is 0.10% by weight or more, preferably greater than 0.5%, 0.8% by mass or more, more preferably 1.0% by mass or more, even more preferably 1.5% by weight or more, or 2% by weight or more, relative to the total of the composition, and is 20% by weight or less, preferably 15% by weight or less, more preferably 10% by weight or less, even more preferably 6% by weight or less, and is 0.01 to 99.99% by weight, 0.1 to 99.9% by weight, 0.1 to 50% by weight, 0.1 to 40% by weight, 0.1 to 30% by weight, 0.1 to 20% by weight, 0.1 to 10% by weight, 0.5 to 10% by weight, 1 to 10% by weight, 1.5 to 10% by weight, or 0.8 to 6% by weight relative to the total of the composition.

As one aspect of the present invention, the dispersant in the composition contains a combination of one or more dispersants selected from the group consisting of bis-butyldimethicone polyglyceryl-3, PEG-9 polydimethylsiloxy ethyl dimethicone, lauryl PEG-9 polydimethylsiloxy ethyl dimethicone, cetyl PEG/PPG-10/1 dimethicone, isostearic acid and carboxydecyl triolefin, and PEG-10 dimethicone, and the content of PEG-10 dimethicone in the composition is 0.1% by weight or more, preferably 1.0% by mass or more, more preferably 1.5% by weight or more, even more preferably 2% by weight or more relative to the total of the composition, and is 20% by weight or less, preferably 15% by weight or less, more preferably 10% by weight or less, and even more preferably 5% by weight or less, is 0.01 to 99.99% by weight, 0.1 to 99.9% by weight, 0.1 to 50% by weight, 0.1 to 40% by weight, 0.1 to 30% by weight, 0.1 to 20% by weight, 0.1 to 10% by weight, 0.5 to 10% by weight, 1 to 10% by weight, 1.5 to 10% by weight, or 0.8 to 3% by weight relative to the total of the composition, and the content of each dispersant of the combination is 0.1% by weight or more, preferably 1.0% by mass or more, more preferably 1.5% by weight or more, and even more preferably 2% by weight or more relative to the total of the composition, and is 20% by weight or less, preferably 15% by weight or less, more preferably 10% by weight or less, and even more preferably 5% by weight or less, and is 0.01 to 50% by weight, 0.1 to 40% by weight, 0.1 to 30% by weight, 0.1 to 20% by weight, 0.1 to 10% by weight, 0.5 to 10% by weight, 1 to 10% by weight, 1.5 to 10% by weight, or 0.8 to 3% by weight relative to the total of the composition.

(C) UV Absorber and/or UV Scattering Agent

UV absorbers and UV scattering agents absorb or scatter incident ultraviolet and are thus considered to indirectly inhibit the function of a UV wavelength conversion substance. However, surprisingly, the composition of the present invention can contain a UV absorber and/or a UV scattering agent and the function of a UV wavelength conversion substance can be exhibited.

The phrase "UV absorber" refers to a substance which absorbs ultraviolet and converts it to the energy of heat or infrared. The UV absorber that can be used in the present invention is not particularly limited as long as the function of the UV wavelength conversion substance is not directly impaired. Examples of the UV absorber include salicylic acid-based UV absorbers such as homomenthyl salicylate, ethylhexyl salicylate, homosalate, and triethanolamine salicylate; cinnamic acid-based UV absorbers such as 2-ethylhexyl para-methoxycinnamate, glyceryl diparamethoxycinnamate mono-2-ethylhexanoate, methyl 2,5-diisopropylcinnamate, 2,4,6-tris[4-(2-ethylhexyloxycarbonyl)anilino]-1,3,5-triazine, (hereinafter also referred to as "ethylhexyl triazone"), isopentyl trimethoxycinnamate trisiloxane, an isopropyl para-methoxycinnamate-diisopropylcinnamate ester mixture, and a diethanolamine p-methoxyhydrocinnamate salt; benzoylmethane UV absorbers such as 2-phenyl-benzimidazole-5-sulfuric acid, 4-isopropyldibenzoylmethane, and 4-tert-butyl-4'-methoxydibenzoylmethane; octocrylene, 2-ethylhexyl dimethoxybenzylidene dioxoimidazolidine propionate, 1-(3,4-dimethoxyphenyl)-4,4-dimethyl-1,3-pentanedione, cinoxate, methyl-O-aminobenzoate, 3-(4-methylbenzylidene)camphor, octyltriazone, hexyl diethylaminohydroxybenzoyl benzoate, bis(ethylhexyloxyphenol)methoxyphenyl triazine, and methylene bis-benzotriazolyl tetramethylbutylphenol. One or more selected therefrom can be contained in the composition.

The total content of the UV absorber that can be contained in the composition of the present invention is 0.5% by weight or more, preferably 1% by weight or more, more preferably 5% by weight or more, even more preferably 7% by weight or more, or most preferably 10% by weight or more, relative to the total of the composition to function as a sunscreen and 40% by weight or less, preferably 30% by weight or less, more preferably 25% by weight or less, even more preferably 20% by weight or less, relative to the total of the composition to avoid excessive absorption of ultraviolet contained in incident light. The total content of the UV absorber that can be contained in the composition of the present invention is 0.5 to 40% by weight, 1 to 40% by weight, 1 to 30% by weight, 5 to 40% by weight, 5 to 30% by weight, 5 to 25% by weight, 7 to 30% by weight, 7 to 25% by weight, 7 to 20% by weight, 10 to 30% by weight, 10 to 25% by weight, or 10 to 20% by weight.

The composition of the present invention may contain a UV scattering agent. The term "UV scattering agent" refers to a substance which can reflect/scatter ultraviolet and protect skin from ultraviolet. Examples of the material of the UV scattering agent that can be used in the present invention include titanium dioxide, zinc oxide other than component (A) or (A'), iron oxide, zirconium oxide, and aluminum oxide. The UV scattering agent may be fine particles or a composite thereof. The UV scattering agent preferably contains one or more selected from titanium dioxide and zinc oxide other than component (A) or (A').

The titanium dioxide and zinc oxide used as the UV scattering agent may be titanium dioxide and zinc oxide used commonly in cosmetics. Preferably, those having superior dispersibility, such as those subjected to a surface treatment by a publicly known method, as needed, specifically those subjected to a hydrophobic treatment, can be contained in the composition.

Examples of the surface treatment include a silicone treatment with methylhydrogen polysiloxane or methylpolysiloxane; a fluorine treatment with perfluoroalkyl phosphoric acid ester or perfluoroalcohol; an amino acid treatment with N-acylglutamic acid; an alkylalkoxysilane treatment with octyltriethoxysilane or octyltrimethoxysilane; and further, a lecithin treatment; a metal soap treatment; a fatty acid treatment; and an alkyl phosphate treatment. Thereamong, zinc oxide surface-treated with silicone is preferably used.

The silicone used for surface treatment is not particularly limited. Examples thereof include methylpolysiloxane, methylphenylpolysiloxane, methylhydrogen polysiloxane, methylcyclopolysiloxane, octamethylcyclotetrasiloxane, decamethylcyclopentasiloxane, dodecamethylcyclohexasiloxane, octamethyltrisiloxane, tetradecamethylhexasiloxane, dimethylsiloxane-methyl(polyoxyethylene)siloxane-methyl(polyoxypropylene)siloxane copolymer, dimethylsiloxane-methyl(polyoxyethylene)siloxane copolymer, dimethylsiloxane-methyl(polyoxypropylene)siloxane copolymer, dimethylsiloxane-methylcetyloxysiloxane copolymer, dimethylsiloxane-methylstearoxysiloxane copolymer, and various other silicones. The silicone is preferably methylhydrogen polysiloxane or methylpolysiloxane.

The total content of the UV scattering agent that can be contained in the composition of the present invention is 0.1% by weight or more, preferably 0.5% by weight or more, more preferably 1% by weight or more, even more preferably 5% by weight or more, or most preferably 10% by weight or more, relative to the total of the composition to function as a sunscreen and 40% by weight or less, preferably 30% by weight or less, more preferably 25% by weight or less, or even more preferably 20% by weight or less, relative to the total of the composition to avoid excessive scattering of ultraviolet contained in incident light. The total content of the UV scattering agent that can be contained in the composition of the present invention is 0.1 to 40% by weight, 0.1 to 30% by weight, 0.1 to 25% by weight, 0.1 to 20% by weight, 0.5 to 40% by weight, 0.5 to 30% by weight, 0.5 to 25% by weight, 0.5 to 20% by weight, 1 to 40% by weight, 1 to 30% by weight, 1 to 25% by weight, 1 to 20% by weight, 5 to 40% by weight, 5 to 30% by weight, 5 to 25% by weight, 5 to 20% by weight, 10 to 40% by weight, 10 to 30% by weight, 10 to 25% by weight, or 10 to 20% by weight.

(D) Oil Content

The composition of the present invention contains an oil content. The phrase "oil content" refers to a hydrophobic substance that phase-separates from water, which is a component of the composition of the present invention. The oil content that can be used in the present invention is not particularly limited and contains one or more of, for example, hydrocarbon oils, ester oils, silicone oils, liquid oils, solid fats, and higher alcohols.

Examples of the hydrocarbon oils include liquid paraffin, tetraisobutane, hydrogenated polydecene, olefin oligomer, isododecane, isohexadecane, squalane, and hydrogenated polyisobutene.

Examples of the ester oils include diisopropyl sebacate, octyl palmitate, cetyl isooctanoate (cetyl 2-ethylhexanoate), triethylhexanoin, neopentyl glycol dicaprate, triisostearin, diisostearyl malate, PPG-3 dipivalate, di-2-ethylhexyl succinate, 2-ethylhexyl 2-ethylhexanoate, polyglyceryl-6 octacaprylate, and glyceryl tri(caprylate/caprate).

Examples of the silicone oils include dimethicone, amino-modified polysiloxane, polyether-modified polysiloxane, alkyl-modified polysiloxane, and fluorine-modified polysiloxane.

Examples of the liquid oils include avocado oil, camellia oil, macadamia nut oil, mink oil, olive oil, castor oil, jojoba oil, triglycerol, and glycerol trioctanoate.

Examples of the solid fats include coconut oil, hardened coconut oil, palm oil, beef tallow, mutton tallow, Japan wax, and hardened castor oil.

Examples of the higher alcohols include isostearyl alcohol, oleyl alcohol, and butylene glycol-propylene glycol copolymer (e.g., PBG/PPG-9/1 copolymer).

The total content of the oil content that can be contained in the composition of the present invention is 10% by weight or more, preferably 15% by weight or more, more preferably 20% by weight or more, or even more preferably 25% by weight or more, relative to the total of the composition.

Optional Component

Various components can be appropriately blended in the composition of the present invention as long as the effect of the present invention is not impaired. Examples of the various components include additive components that can be blended generally in cosmetics, such as clay minerals (dimethyldistearylammonium hectorite), powders (polymethyl methacrylate, crosslinked silicone/network-type silicone block copolymer, silica, talc including hydrophobized talc, starches such as cornstarch, and polyurethane including hydrophobized polyurethane), chelating agents (disodium edetate hydrate), fragrances, moisturizing agents (glycerin, dipropylene glycol), preservatives, oil-phase solidifying agents (sucrose tetrastearate triacetate, dextrin palmitate, palmitic acid, glyceryl (behenate/eicosadioate), N-lauroyl L-glutamic acid dibutylamide, polyamide-8), anionic surfactants, cationic surfactants, amphoteric surfactants, nonionic surfactants, moisturizing agents, water-soluble polymers, silicone-modified polysaccharides, other film-forming agents, metal ion sequestering agents, lower alcohols, polyhydric alcohols, various extracts, sugars, amino acids, organic amines, polymer emulsions, pH adjusters, skin nutrients, vitamins, pharmaceuticals, quasi-drugs, water-soluble drugs applicable to cosmetics, antioxidants, buffering agents, antioxidation agents, injection agents, organic powders, pigments, dyes, colors, water, acid components, and alkaline components. These optional components can be appropriately blended in an oil phase or a water phase. Further, another cell activating agent may be contained or co-used to enhance the effect of the present invention.

One aspect of the composition of the present invention is a water-in-oil type composition. The water-in-oil type composition of the present invention can be produced by a conventional method.

Specifically, the composition of the present embodiment is obtained in accordance with the following procedures: a UV absorber, a UV scattering agent, and other appropriate oil-based components are mixed to prepare an oil phase, and when dispersed in the oil phase, component (A) or (A') and component (B) are mixed. Subsequently, other appropriate water-soluble components are mixed to prepare a water phase, and when dispersed in the water phase, component (A) or (A') and component (B) are mixed. The water phase is added to the oil phase and stirred to obtain a composition.

One aspect of the composition of the present invention is a water-in-oil type composition containing a powder. Examples of the powder include polymethyl methacrylate, crosslinked silicone/network-type silicone block copolymer, silica, talc including hydrophobized talc, starches such as cornstarch, and polyurethane including hydrophobized polyurethane. The water-in-oil type composition containing a powder of the present invention can be produced by a conventional method.

The composition of the present invention includes compositions which can be applied to cosmetic bases or sunscreen cosmetics such as a sunscreen cream. The formulation form may be, for example, an emulsion or a cream.

The composition of the present invention can be used by applying it to any of skin, in particular, skin excluding hair, preferably face, body, limbs, preferably by coating. For example, by the application, preferably coating, of the composition of the present embodiment, not only can skin be protected from ultraviolet to suppress adverse effects on the skin, the skin can also be imparted with natural and preferable brightness via activation of skin cells.

EXAMPLES

The present invention will be described in more detail with reference to the following Examples. Note that the present invention is not limited thereto.

Example 1: Cell Activation Effects of Various UV Wavelength Conversion Substances Experiment 1-1: Preparation of UV Wavelength Conversion Substance A UV wavelength conversion substance was prepared as follows:

(1) B-Phycoerythrin

B-phycoerythrin was obtained from *Porphiridium Cruentum* extract. The absorption spectrum thereof had a peak wavelength of 305 nm, and the emission spectrum thereof had peak wavelengths of 570 nm and 610 nm.

(2) C-Phycocyanin

C-phycocyanin was obtained from *Spirulina platensis* extract. The absorption spectrum thereof had a peak wavelength of 350 nm, and the emission spectrum thereof had peak wavelengths of 640 nm and 700 nm. Linablue by DIC Corp. was used.

(3) Zinc Oxide Phosphor

Lumate G by Sakai Chemical Industry Co., Ltd. was used. Lumate G is a zinc oxide phosphor of ZnO doped with a sulfur-containing compound, as described in WO 2018/004006. The absorption spectrum thereof had a peak wavelength of 365 nm, and the emission spectrum thereof had a peak wavelength of 510 nm.

(4) Magnesium Titanate Phosphor

Lumate R by Sakai Chemical Industry Co., Ltd. was used. Lumate R is a magnesium titanate phosphor of $MgTiO_3$ doped with manganese. The absorption spectrum thereof had a peak wavelength of 365 nm, and the emission spectrum thereof had a peak wavelength within a zone of 660 to 680 nm.

The UV wavelength conversion substances (1) and (2) were dissolved in water to prepare solutions having a concentration of 1% or 5%.

The UV wavelength conversion substances (3) and (4) were dispersed in alcohol to prepare 5% and 10% dispersions.

Experiment 1-2: Preparation of Cell Sample

A cell sample was prepared as follows:
1. Human dermal fibroblasts and human skin keratinocytes purchased from Kurabo Industries Ltd. were used. A cell suspension (1 mL) stored in liquid nitrogen was thawed in a water bath (37° C.) to an extent that small ice pellets remained, and then diluted with 9 mL of warm medium.
2. The diluted suspension was mixed gently and then transferred to a T75 flask and incubated overnight at 37° C.
3. The next day, the medium was replaced with 10 mL of fresh medium.
4. The medium was replaced periodically (once every 2 days for fibroblasts and once every 2 to 3 days for keratinocytes) and cell proliferation was continued. Meanwhile, the cells were observed using a microscope, and it was confirmed that the cells grew in the correct form.
5. After the cells reached about 80% confluence, the cells were passaged. The cells were passaged by washing the cells once with 10 mL of warm PBS, adding 5 mL of warm trypsin to a T75 flask, covering the bottom of the flask with a trypsin solution, followed by aspirating at room temperature for 1 minute.
6. The flask was allowed to stand in an oven at 37° C. for (maximum) 2 minutes for fibroblasts and (maximum) 7 minutes for keratinocytes. The cells were observed using a microscope and confirmed to be small and oval.
7. Thereafter, the side of the T75 flask was lightly tapped to release the cells. The cells were observed using a microscope and confirmed to be moving freely.
8. Fibroblasts were resuspended in 5 mL warm FGM (containing 10% serum) and transferred to a sterile 50 mL Falcon tube. An additional 5 mL of warm FGM was used to flush the flask and added to the Falcon tube to ensure transfer of all cells.
9. The cells were centrifuged at 10,000 rpm for 5 minutes (4° C.) and the supernatant was removed taking care not to disturb the pellet of cells.
10. Depending on the cell type, fibroblasts were resuspended in FGM or KGM at a concentration of $2 \times 10^4$ cells/well (500 µL), and keratinocytes were resuspended in FGM or KGM at a concentration of $4 \times 10^4$ cells/well (500 µL) and plated 24-well plates.
11. Cells were seeded in 24-well plates and the media were changed periodically (once every 2 days for fibroblasts and once every 2 to 3 days for keratinocytes) and the cells were grown until 60 to 70% confluence (depending on the type of experiment) was reached. (Note: Fibroblasts should reach the desired confluency in 24 hours at a cell density of $2 \times 10^4$ cells/well. When the cell density is low, for example, $1 \times 10^4$ cells/well, it takes 48 hours for fibroblasts to reach the desired confluency.)
12. 24 hours before irradiation, the medium was changed to a supplement-free medium (in the case of keratinocytes) or a medium containing a low concentration of serum (0.5% FCS) (in the case of fibroblasts).

Experiment 1-3: Ultraviolet Irradiation

1. A solar simulator was turned on at least 30 minutes before irradiation to warm up a lamp. The solar simulator was set to use a UG11 filter. UG11 filters are filters that allow only UVB to pass and cut light of other wavelengths. The UV light passed through the UG11 filter had a peak wavelength of 300 nm to 385 nm.
2. A temperature control plate was turned on and set to 33° C.
3. The cells prepared in Experiment 1-2 were washed once with warm PBS.
4. To each well was added 0.5 mL of a warmed Martinez solution (145 mM NaCl, 5.5 mM KCl, 1.2 mM $MgCl_2.6H_2O$, 1.2 mM $NaH_2PO_4.2H_2O$, 7.5 mM HEPES, 1 mM $CaCl_2$), and 10 mM D-glucose).
5. As depicted in FIG. 1, cell wells were placed on a plate. Then, 0.4 ml of a solution containing the UV wavelength conversion substances (1) to (4) prepared in Experiment 1-1 was injected into each well of a 24-well plate. The wells containing cells were placed to be covered, such that the cell solution was irradiated with UV light through the solution of the UV wavelength conversion substances without direct contact between the UV wavelength conversion substance solution and the cell solution.

6. Irradiation was carried out to a total dose of 100 mJ/cm$^2$. Further, as controls, there were prepared a sample of cells irradiated directly with UV light without placing a plate of a UV wavelength conversion substance on cell wells and a sample of cells cultured in the dark without irradiation with UV light.

7. After irradiation, the Martinez was replaced with warm KGM (without supplements) or FGM (containing 0.5% FCS) and the plate was returned to the incubator at 37° C.

Experiment 1-4: Measurement of Cell Activity

After the completion of Experiment 1-3, the cells maintained in the incubator for 48 hours were used to measure the activity by the following method:

1. A medium (KGM medium without supplements or 0.5% FCS-containing FGM medium) was supplemented with 10% AlamarBlue and warmed to 37° C. (Keep the solution in the dark.)
2. The medium in the wells was replaced with 500 μL of the above 10% AlamarBlue solution, and the plate was returned to the incubator at 37° C. for about 3 hours. Control wells were also maintained in the incubator. These solutions were maintained in the dark to protect them from light.
3. After 3 hours, 100 μL aliquots were collected and transferred to a black 96-well plate.
4. Fluorescence measurement values at 544 nm/590 nm were read using a fluorometer (OPwave +, Ocean Photonics).

Figure 2:
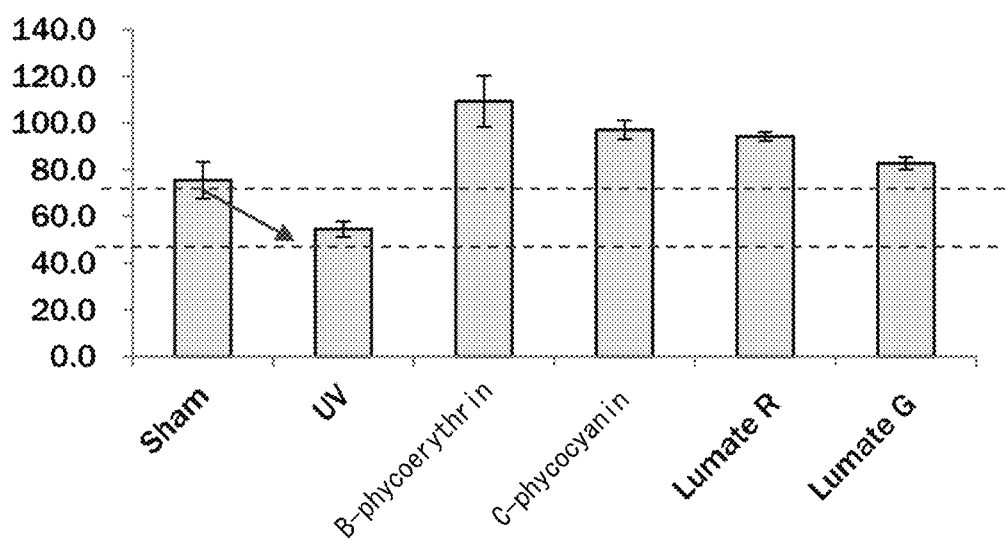
FIG. 2 shows the cell activity at UV irradiation using each ultraviolet in Experiment 1. The vertical axis indicates relative fluorescence intensity (au).

The results are shown in FIG. 2. UV irradiation reduced cell activity compared to the control without irradiation. However, the activity of cells irradiated with UV through any UV wavelength conversion substance was increased compared to the control without irradiation. From the above results, it was found that although the cell activity was decreased by UV irradiation, the decrease in cell activity is suppressed using a UV wavelength conversion substance.

Example 2: Influence of Concentration of UV Wavelength Conversion Substance or Intensity of UV on Cell Activity The same method as in Experiment 1 was employed except that C-phycocyanin was used as the UV wavelength conversion substance, a cell culture was covered with a plate of a solution containing C-phycocyanin at 0%, 0.4%, or 2%, and irradiated with UV at a dose of 0, 10, 25, 50, 75, or 100 mJ/cm$^2$.

Figure 3:
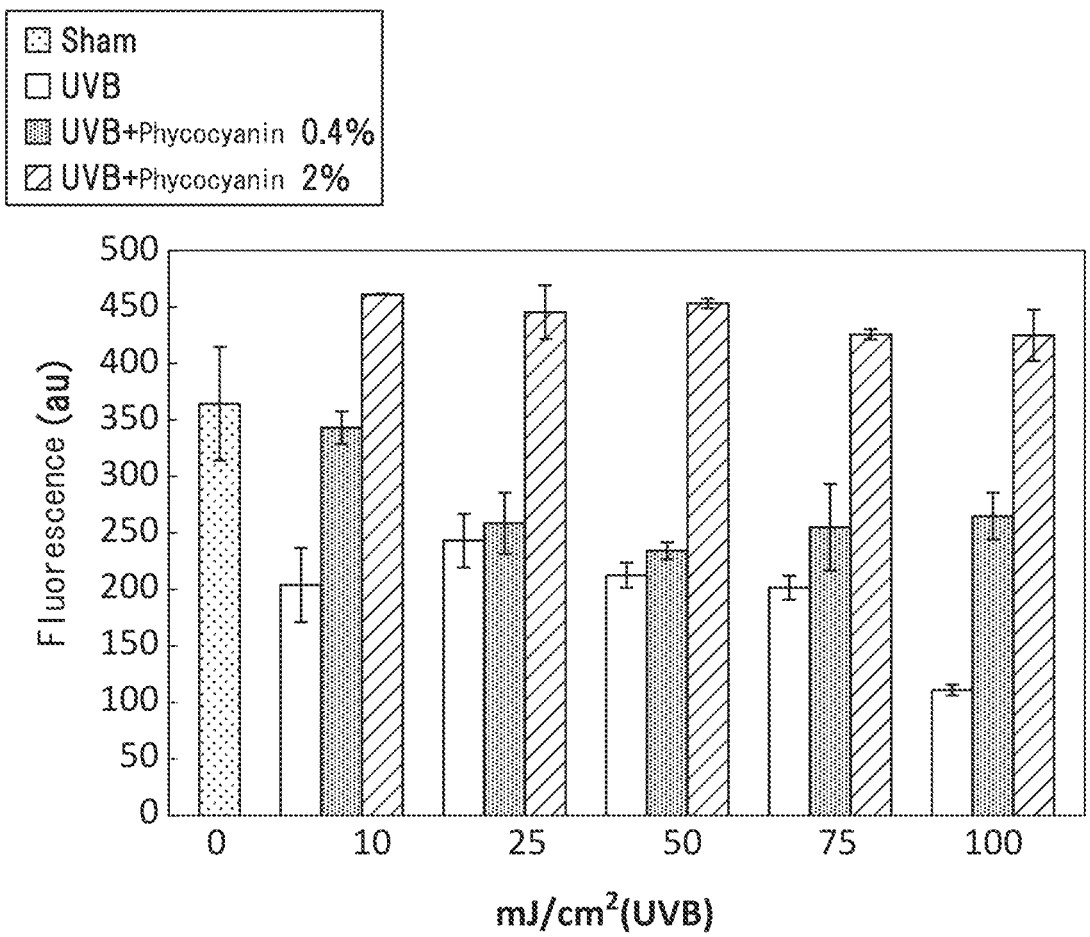
FIG. 3 shows the cell activity at UV irradiation of each intensity using C-phycocyanin in each concentration in Experiment 2 as the relative fluorescence intensity (au).

The results are shown in FIG. 3. When the UV wavelength conversion substance was not used, the cell activity decreased as the UV irradiation amount increased. However, when 0.4% C-phycocyanin was added, the decrease in cell activity was suppressed even when UV irradiation was carried out, and when 2% C-phycocyanin was added, the cell activity was even increased compared to the case where UV irradiation was not carried out. From the above results, it was found that although the cell activity was decreased by UV irradiation, the use of a UV wavelength conversion substance not only suppressed the decrease in cell activity in a concentration-dependent manner, but also enhanced the cell activity.

Example 3: Restoration of Cell Activity Decreased by UV Irradiation

Figure 4:
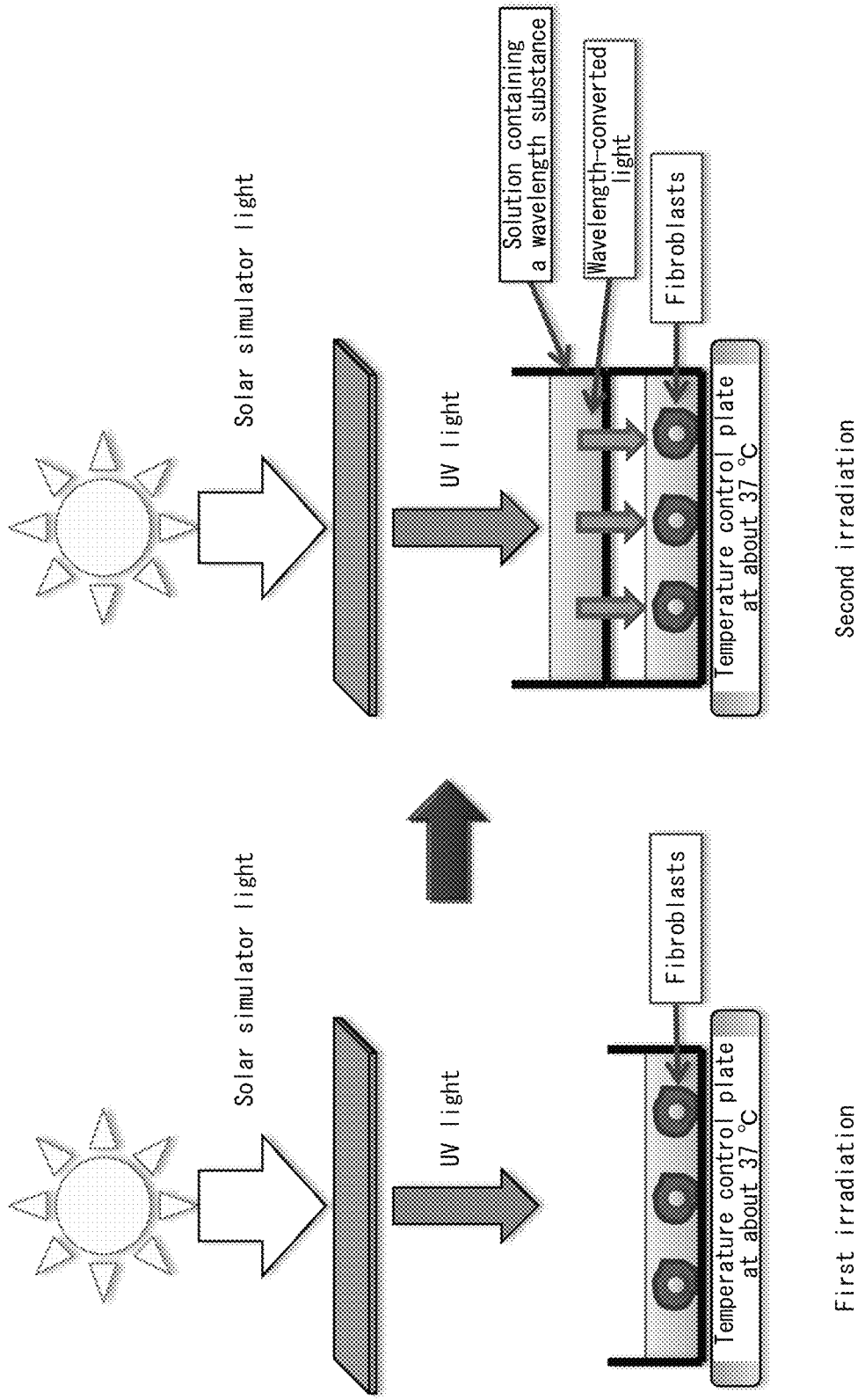
FIG. 4 is a schematic diagram of Experiment 3.

The same method as in Experiment 1 was employed except that as shown in FIG. 4, UV irradiation was carried out without using a UV wavelength conversion substance until the irradiation amount reached 400 mJ/cm$^2$ to once decrease the cell activity, and a cell culture was covered with a plate of a solution containing C-phycocyanin as the UV wavelength conversion substance at 0%, 0.4%, or 2%, and irradiated with UV at a dose of 0, 10, 25, 50, 75, 100, or 200 mJ/cm$^2$.

The results are shown in FIG. 5. It can be seen that cell activity was recovered by subjecting even cells having once decreased activity by UV irradiation without using a UV wavelength conversion substance to UV irradiation using a UV wavelength conversion substance. This effect of C-phycocyanin was equivalent at concentrations of 0.4% and 2%, suggesting a sufficient cell activation effect at 0.4%. On the other hand, when UV irradiation was carried out without using a UV wavelength conversion substance, the cell activity decreased in a UV dose-dependent manner.

The results for human dermal fibroblasts are described above. Similar results were also observed for keratinocytes (data not shown). From these results, it was found that a UV wavelength conversion substance not only suppressed a decrease in cell activity due to UV irradiation, but also has an effect of activating cells using UV light. When skin cells are activated, prevention of and improvement from wrinkles, spots, skin aging, photoaging, etc. are expected.

From Examples 1 to 3 above, it was considered that a UV wavelength conversion substance converts the wavelength of ultraviolet, and emitted visible light (fluorescence having a main wavelength of 500 nm to 700 nm) activates skin cells such as fibroblasts and comeocytes. Thus, various compositions containing a UV wavelength conversion substance were produced, and the amount of fluorescence emitted during ultraviolet irradiation was evaluated.

For fluorescence measurement, the composition was applied to an S plate (refer to Japanese Registered Patent Publication No. 4453995) at 2 mg/cm$^2$ and dried to prepare a coating film of the composition. The obtained coating film was irradiated with ultraviolet having a predetermined wavelength, and a fluorescence integrated value in a predetermined wavelength region was measured using a fluorescence spectrophotometer RF-5300PC (Shimadzu Corporation). When the UV wavelength conversion substance was a zinc oxide phosphor, a coating film was irradiated with ultraviolet at 365 nm, and the fluorescence integrated value of 400 to 600 nm was measured in the same manner. When the UV wavelength conversion substance was a magnesium titanate phosphor, a coating film was irradiated with ultraviolet at 340 nm, and the fluorescence integrated value of 550 to 800 nm was measured in the same manner. When the UV wavelength conversion substance was C-phycocyanin, a coating film was irradiated with ultraviolet light at 350 nm, and fluorescence integrated values at 550 to 800 nm were measured in the same manner. When the UV wavelength conversion substance was vitamin B2, a coating film was irradiated with ultraviolet at 270 nm, and the fluorescence integrated value at 400 to 750 nm was measured in the same manner.

Example 4: Function of UV Wavelength Conversion Substance in Presence of UV Absorber/UV Scattering Agent Compositions (Formulation Examples U1, U2) having the compositions shown in Table 1 were produced according to a conventional production process. Formulation Examples U1, U2 contained a zinc oxide phosphor (LumateG), which is a UV wavelength conversion substance, and Formulation Example U2 further contained a UV absorber (octocrylene, ethylhexyl salicylate and homosalate) and a UV scattering agent (fine particulate zinc oxide). Though the fluorescence integrated value of Formulation Example U2 was decreased to 3570 relative to the fluorescence integrated value of Formulation Example U1 of 25624, it was found to have a wavelength conversion function even in the presence of a UV absorber/UV scattering agent.

TABLE 1

| | Formulation composition | Formulation Example U1 | Formulation Example U2 |
|---|---|---|---|
| Water | water | Total amount of 100 with water | |
| Alcohol | ethanol | 5 | 5 |
| Moisturizing agent | glycerin | 2 | 2 |
| | dipropylene glycol | 3 | 3 |
| Clay minerals | dimethyldistearylammonium hectorite | 0.2 | 0.2 |
| Dispersant | PEG-10 dimethicone | 0.8 | 0.8 |
| Oil content | dimethicone | 20 | 10 |
| | isododecane | 10 | 10 |
| | PBG/PPG-9/1copolymer | 2 | 2 |
| | octyl palmitate | 3 | 3 |
| UV absorber | octocrylene | | 3 |
| | ethylhexyl salicylate | | 5 |
| | homosalate | | 5 |
| UV scattering agent | fine particulate zinc oxide | | 10 |
| Phosphor | zinc oxide phosphor | 5 | 5 |
| Powder | silica | 2 | 2 |
| | hydrophobized talc | 2 | 2 |
| Oil phase thickener | sucrose tetrastearate triacetate | 0.3 | 0.3 |
| Chelating agent | chelating agent | q.s. | q.s. |
| Preservative | preservative | q.s. | q.s. |
| Fragrance | fragrance | q.s. | q.s. |
| | fluorescence integrated value | 25624 | 3570 |

Example 5: Effect of Zinc Oxide Phosphor as UV Wavelength Conversion Substance

Compositions (Formulation Examples G1 to G6) having the compositions shown in Table 2 were produced according to a conventional production process. Each Formulation Example contained a zinc oxide phosphor as the UV wavelength conversion substance. Formulation Examples G1 to G6 had fluorescence integrated values of 669, 2230, 4273, 16116, 23515, and 43316, respectively. It was found that the zinc oxide phosphor had a wavelength conversion function in a dose-dependent manner even when the zinc oxide phosphor was contained in a composition.

TABLE 2

| | Formulation composition | Formulation Example G1 | Formulation Example G2 | Formulation Example G3 | Formulation Example G4 | Formulation Example G5 | Formulation Example G6 |
|---|---|---|---|---|---|---|---|
| Water | water | Total amount of 100 with water | | | | | |
| Alcohol | ethanol | 5 | 5 | 5 | 5 | 5 | 5 |
| Moisturizing agent | glycerin | 2 | 2 | 2 | 2 | 2 | 2 |
| | dipropylene glycol | 3 | 3 | 3 | 3 | 3 | 3 |
| Clay minerals | dimethyldistearylammonium hectorite | 0.2 | 0.2 | 0.2 | 0.2 | 0.2 | 0.2 |
| Dispersant | PEG-10 dimethicone | 3 | 3 | 3 | 3 | 3 | 3 |
| | lauryl PEG-9 polydimethylpolysiloxyethyl dimethicone | 3 | 3 | 3 | 3 | 3 | 3 |
| Oil content | dimethicone | 10 | 10 | 10 | 10 | 10 | 10 |
| | isododecane | 10 | 10 | 10 | 10 | 10 | 10 |
| | PBG/PPG-9/1 copolymer | 2 | 2 | 2 | 2 | 2 | 2 |
| | octyl palmitate | 3 | 3 | 3 | 3 | 3 | 3 |
| UV absorber | octocrylene | 3 | 3 | 3 | 3 | 3 | 3 |
| | ethylhexyl salicylate | 5 | 5 | 5 | 5 | 5 | 5 |
| | homosalate | 5 | 5 | 5 | 5 | 5 | 5 |

TABLE 2-continued

| Formulation composition | | Formulation Example G1 | Formulation Example G2 | Formulation Example G3 | Formulation Example G4 | Formulation Example G5 | Formulation Example G6 |
|---|---|---|---|---|---|---|---|
| UV scattering agent | fine particulate zinc oxide | 10 | 10 | 10 | 10 | 10 | 10 |
| Phosphor | zinc oxide phosphor | 0.1 | 0.5 | 1 | 3 | 5 | 10 |
| Powder | silica | 2 | 2 | 2 | 2 | 2 | 2 |
|  | hydrophobized talc | 2 | 2 | 2 | 2 | 2 | 2 |
| Oil phase thickener | sucrose tetrastearate triacetate | 0.3 | 0.3 | 0.3 | 0.3 | 0.3 | 0.3 |
| Chelating agent | chelating agent | q.s. | q.s. | q.s. | q.s. | q.s. | q.s. |
| Preservative | preservative | q.s. | q.s. | q.s. | q.s. | q.s. | q.s. |
| Fragrance | fragrance | q.s. | q.s. | q.s. | q.s. | q.s. | q.s. |
|  | fluorescence integrated value | 669 | 2230 | 4273 | 16117 | 23515 | 43316 |

Example 6: Effect of Magnesium Titanate Phosphor as UV Wavelength Conversion Substance Compositions (Formulation Examples R1 to R5) having the compositions shown in Table 3 were produced according to a conventional production process. Each Formulation Example contained a magnesium titanate phosphor as the UV wavelength conversion substance. Formulation Examples R1 to R5 had fluorescence integrated values of 4986, 7537, 5797, 5488, and 8746, respectively. It was found that magnesium titanate phosphor had a wavelength conversion function in a dose-dependent manner even when the magnesium titanate phosphor was contained in a composition.

TABLE 3

| Formulation composition | | Formulation Example R1 | Formulation Example R2 | Formulation Example R3 | Formulation Example R4 | Formulation Example R5 |
|---|---|---|---|---|---|---|
| Water | water | Total amount of 100 with water | | | | |
| Alcohol | ethanol | 5 | 5 | 5 | 5 | 5 |
| Moisturizing agent | glycerin | 2 | 2 | 2 | 2 | 2 |
|  | dipropylene glycol | 3 | 3 | 3 | 3 | 3 |
| Clay minerals | dimethyldistearylammonium hectorite | 0.2 | 0.2 | 0.2 | 0.2 | 0.2 |
| Dispersant | PEG-10 dimethicone | 3 | 3 | 3 | 3 | 3 |
|  | lauryl PEG-9 polydimethylpolysiloxyethyl dimethicone | 3 | 3 | 3 | 3 | 3 |
| Oil content | dimethicone | 10 | 10 | 10 | 10 | 10 |
|  | isododecane | 10 | 10 | 10 | 10 | 10 |
|  | PBG/PPG-9/1copolymer | 2 | 2 | 2 | 2 | 2 |
|  | octyl palmitate | 3 | 3 | 3 | 3 | 3 |
| UV absorber | octocrylene | 3 | 3 | 3 | 3 | 3 |
|  | ethylhexyl salicylate | 5 | 5 | 5 | 5 | 5 |
|  | homosalate | 5 | 5 | 5 | 5 | 5 |
| UV scattering agent | fine particulate zinc oxide | 10 | 10 | 10 | 10 | 10 |
| Phosphor | magnesium titanate phosphor | 0.1 | 0.5 | 3 | 5 | 10 |
| Powder | silica | 2 | 2 | 2 | 2 | 2 |
|  | hydrophobized talc | 2 | 2 | 2 | 2 | 2 |
| Oil phase thickener | sucrose tetrastearate triacetate | 0.3 | 0.3 | 0.3 | 0.3 | 0.3 |
| Chelating agent | chelating agent | q.s. | q.s. | q.s. | q.s. | q.s. |
| Preservative | preservative | q.s. | q.s. | q.s. | q.s. | q.s. |
| Fragrance | fragrance | q.s. | q.s. | q.s. | q.s. | q.s. |
|  | fluorescence integrated value | 4986 | 7537 | 5797 | 5488 | 8746 |

Example 7: Effect of C-Phycocyanin as UV Wavelength Conversion Substance

Compositions (Formulation Examples L1 to L5) having the compositions shown in Table 4 were produced according to a conventional production process. Each Formulation Example contained C-phycocyanin as the UV wavelength conversion substance. Formulation Examples L1 to L5 had fluorescence integrated values of 6308, 11937, 9287, 5608, and 3946, respectively. It was found that C-phycocyanin had a wavelength conversion function even when included in a composition, and the ultraviolet wavelength conversion effect had an optimal, bell-shaped dose-dependence at a concentration of 0.5% to 3% of C-phycocyanin.

TABLE 4

| Formulation composition | | Formulation Example L1 | Formulation Example L2 | Formulation Example L3 | Formulation Example L4 | Formulation Example L5 |
|---|---|---|---|---|---|---|
| Water | water | Total amount of 100 with water | | | | |
| Alcohol | ethanol | 5 | 5 | 5 | 5 | 5 |
| Moisturizing agent | glycerin | 2 | 2 | 2 | 2 | 2 |
| | dipropylene glycol | 3 | 3 | 3 | 3 | 3 |
| Clay minerals | dimethyldistearylammonium hectorite | 0.2 | 0.2 | 0.2 | 0.2 | 0.2 |
| Dispersant | PEG-10 dimethicone | 3 | 3 | 3 | 3 | 3 |
| | lauryl PEG-9 polydimethylpolysiloxyethyl dimethicone | 3 | 3 | 3 | 3 | 3 |
| Oil content | dimethicone | 10 | 10 | 10 | 10 | 10 |
| | isododecane | 10 | 10 | 10 | 10 | 10 |
| | PBG/PPG-9/1copolymer | 2 | 2 | 2 | 2 | 2 |
| | octyl palmitate | 3 | 3 | 3 | 3 | 3 |
| UV absorber | octocrylene | 3 | 3 | 3 | 3 | 3 |
| | ethylhexyl salicylate | 5 | 5 | 5 | 5 | 5 |
| | homosalate | 5 | 5 | 5 | 5 | 5 |
| UV scattering agent | fine particulate zinc oxide | 10 | 10 | 10 | 10 | 10 |
| Phosphor | C-phycocyanin | 0.1 | 0.5 | 1 | 3 | 5 |
| Powder | silica | 2 | 2 | 2 | 2 | 2 |
| | hydrophobized talc | 2 | 2 | 2 | 2 | 2 |
| Oil phase thickener | sucrose tetrastearate triacetate | 0.3 | 0.3 | 0.3 | 0.3 | 0.3 |
| Chelating agent | chelating agent | q.s. | q.s. | q.s. | q.s. | q.s. |
| Preservative | preservative | q.s. | q.s. | q.s. | q.s. | q.s. |
| Fragrance | fragrance | q.s. | q.s. | q.s. | q.s. | q.s. |
| | fluorescence integrated value | 6308 | 11937 | 9287 | 5608 | 3946 |

Example 8: Effect of Dispersant PEG-10 Dimethicone

Compositions (Formulation Examples D1 to D4) having the compositions shown in Table 5 were produced according to a conventional production process. Each Formulation Example contained zinc oxide phosphor, which is a UV wavelength conversion substance. Formulation Examples D1 to D4 had fluorescence integrated values of 3570, 4015, 5657, and 6500, respectively. It was found that dispersant PEG-10 dimethicone enhanced the wavelength conversion function of zinc oxide phosphor in a dose-dependent manner, and further enhanced the wavelength conversion function when combined with another dispersant lauryl PEG-9 polydimethylsiloxy ethyl dimethicone.

TABLE 5

| Formulation composition | | Formulation Example D1 | Formulation Example D2 | Formulation Example D3 | Formulation Example D4 |
|---|---|---|---|---|---|
| Water | water | Total amount of 100 with water | | | |
| Alcohol | ethanol | 5 | 5 | 5 | 5 |
| Moisturizing agent | glycerin | 2 | 2 | 2 | 2 |
| | dipropylene glycol | 3 | 3 | 3 | 3 |
| Clay minerals | dimethyldistearylammonium hectorite | 0.2 | 0.2 | 0.2 | 0.2 |
| Dispersant | PEG-10 dimethicone | 0.8 | 1.5 | 3 | 3 |
| | lauryl PEG-9 polydimethylpolysiloxyethyl dimethicone | | | | 3 |
| Oil content | dimethicone | 10 | 10 | 10 | 10 |
| | isododecane | 10 | 10 | 10 | 10 |
| | PBG/PPG-9/1copolymer | 2 | 2 | 2 | 2 |
| | octyl palmitate | 3 | 3 | 3 | 3 |
| UV absorber | octocrylene | 3 | 3 | 3 | 3 |
| | ethylhexyl salicylate | 5 | 5 | 5 | 5 |
| | homosalate | 5 | 5 | 5 | 5 |
| UV scattering agent | fine particulate zinc oxide | 10 | 10 | 10 | 10 |
| Phosphor | zinc oxide phosphor | 5 | 5 | 5 | 5 |
| Powder | silica | 2 | 2 | 2 | 2 |
| | hydrophobized talc | 2 | 2 | 2 | 2 |
| Oil phase thickener | sucrose tetrastearate triacetate | 0.3 | 0.3 | 0.3 | 0.3 |
| Chelating agent | chelating agent | q.s. | q.s. | q.s. | q.s. |
| Preservative | preservative | q.s. | q.s. | q.s. | q.s. |
| Fragrance | fragrance | q.s. | q.s. | q.s. | q.s. |
| | fluorescence integrated value | 3570 | 4015 | 5657 | 6500 |

Example 9: Effect of Dispersant Combination

Compositions (Formulation Examples M1 to M10) having the compositions shown in Table 6 were produced by a conventional production process. Each Formulation Example contained a zinc oxide phosphor, which is a UV wavelength conversion substance. Formulation Examples M1 to M10 had fluorescence integrated values of 4294, 5685, 6779, 7412, 7608, 7016, 4309, 7305, 3633, and 1531, respectively, and it was found that the wavelength conversion function of the zinc oxide phosphor was enhanced by the combination of bis-butyldimethicone polyglyceryl-3, PEG-9 polydimethylsiloxy ethyl dimethicone, lauryl PEG-9 polydimethylsiloxy ethyl dimethicone, cetyl PEG/PPG-10/1 dimethicone, isostearic acid, or carboxydecyl trisiloxane with dispersant PEG-10 dimethicone as compared to PEG-10 dimethicone alone.

TABLE 6

| | Formulation composition | Formulation Example M1 | Formulation Example M2 | Formulation Example M3 | Formulation Example M4 | Formulation Example M5 | Formulation Example M6 |
|---|---|---|---|---|---|---|---|
| Water | water | Total amount of 100 with water | | | | | |
| Alcohol | ethanol | 5 | 5 | 5 | 5 | 5 | 5 |
| Moisturizing agent | glycerin | 2 | 2 | 2 | 2 | 2 | 2 |
| | dipropylene glycol | 3 | 3 | 3 | 3 | 3 | 3 |
| Clay minerals | dimethyldistearylammonium hectorite | 0.2 | 0.2 | 0.2 | 0.2 | 0.2 | 0.2 |
| Dispersant | PEG-10 dimethicone | 3 | 3 | 3 | 3 | 3 | 3 |
| | bis-butyldimethicone polyglyceryl-3 | | 2 | | | | |
| | PEG-9 polydimethylpolysiloxyethyl dimethicone | | | 2 | | | |
| | lauryl PEG-9 polydimethylpolysiloxyethyl dimethicone | | | | 2 | | |
| | cetyl PEG/PPG-10/1dimethicone | | | | | 2 | |
| | isostearic acid | | | | | | 2 |
| | diisostearic acid polyglyceryl-2 | | | | | | |
| | carboxydecyl trisiloxane | | | | | | |
| | PEG-12 dimethicone | | | | | | |
| | polyoxyethylene sorbitan monostearate | | | | | | |
| Oil content | dimethicone | 10 | 10 | 10 | 10 | 10 | 10 |
| | isododecane | 10 | 10 | 10 | 10 | 10 | 10 |
| | PBG/PPG-9/1copolymer | 2 | 2 | 2 | 2 | 2 | 2 |
| | octyl palmitate | 3 | 3 | 3 | 3 | 3 | 3 |
| UV absorber | octocrylene | 3 | 3 | 3 | 3 | 3 | 3 |
| | ethylhexyl salicylate | 5 | 5 | 5 | 5 | 5 | 5 |
| | homosalate | 5 | 5 | 5 | 5 | 5 | 5 |
| UV scattering agent | fine particulate zinc oxide | 10 | 10 | 10 | 10 | 10 | 10 |
| Phosphor | zinc oxide phosphor | 5 | 5 | 5 | 5 | 5 | 5 |
| Powder | silica | 2 | 2 | 2 | 2 | 2 | 2 |
| | hydrophobized talc | 2 | 2 | 2 | 2 | 2 | 2 |
| Oil phase thickener | sucrose tetrastearate triacetate | 0.3 | 0.3 | 0.3 | 0.3 | 0.3 | 0.3 |
| Chelating agent | chelating agent | q.s. | q.s. | q.s. | q.s. | q.s. | q.s. |
| Preservative | preservative | q.s. | q.s. | q.s. | q.s. | q.s. | q.s. |
| Fragrance | fragrance | q.s. | q.s. | q.s. | q.s. | q.s. | q.s. |
| | fluorescence integrated value | 4294 | 5685 | 6779 | 7412 | 7608 | 7016 |

| | Formulation composition | Formulation Example M7 | Formulation Example M8 | Formulation Example M9 | Formulation Example M10 |
|---|---|---|---|---|---|
| Water | water | Total amount of 100 with water | | | |
| Alcohol | ethanol | 5 | 5 | 5 | 5 |
| Moisturizing agent | glycerin | 2 | 2 | 2 | 2 |
| | dipropylene glycol | 3 | 3 | 3 | 3 |
| Clay minerals | dimethyldistearylammonium hectorite | 0.2 | 0.2 | 0.2 | 0.2 |
| Dispersant | PEG-10 dimethicone | 3 | 3 | 3 | 3 |
| | bis-butyldimethicone polyglyceryl-3 | | | | |
| | PEG-9 polydimethylpolysiloxyethyl dimethicone | | | | |
| | lauryl PEG-9 polydimethylpolysiloxyethyl dimethicone | | | | |
| | cetyl PEG/PPG-10/1dimethicone | | | | |
| | isostearic acid | | | | |
| | diisostearic acid polyglyceryl-2 | 2 | | | |
| | carboxydecyl trisiloxane | | 2 | | |
| | PEG-12 dimethicone | | | 2 | |
| | polyoxyethylene sorbitan monostearate | | | | 2 |
| Oil content | dimethicone | 10 | 10 | 10 | 10 |
| | isododecane | 10 | 10 | 10 | 10 |
| | PBG/PPG-9/1copolymer | 2 | 2 | 2 | 2 |
| | octyl palmitate | 3 | 3 | 3 | 3 |
| UV absorber | octocrylene | 3 | 3 | 3 | 3 |
| | ethylhexyl salicylate | 5 | 5 | 5 | 5 |
| | homosalate | 5 | 5 | 5 | 5 |

TABLE 6-continued

| | | | | | |
|---|---|---|---|---|---|
| UV scattering agent | fine particulate zinc oxide | 10 | 10 | 10 | 10 |
| Phosphor | zinc oxide phosphor | 5 | 5 | 5 | 5 |
| Powder | silica | 2 | 2 | 2 | 2 |
| | hydrophobized talc | 2 | 2 | 2 | 2 |
| Oil phase thickener | sucrose tetrastearate triacetate | 0.3 | 0.3 | 0.3 | 0.3 |
| Chelating agent | chelating agent | q.s. | q.s. | q.s. | q.s. |
| Preservative | preservative | q.s. | q.s. | q.s. | q.s. |
| Fragrance | fragrance | q.s. | q.s. | q.s. | q.s. |
| | fluorescence integrated value | 4309 | 7305 | 3633 | 1531 |

Example 10: Effect of Powder

Compositions (Formulation Examples P1 to P7) having the compositions shown in Table 7 were produced by a conventional production process. Each Formulation Example contained zinc oxide phosphor, which is a UV wavelength conversion substance. Formulation Examples M1 to M10 had fluorescence integrated values of 19133, 21805, 19486, 23191, 21689, 21788, and 22552, respectively, and it was found that the inclusion of various powders in the composition did not suppress the wavelength conversion function of the zinc oxide phosphor, and silica powder enhanced the wavelength conversion function of the zinc oxide phosphor. From this, it was considered that a water-in-oil composition containing a powder could also be produced as a cell activator.

Examples 11: Effects of Dispersant Combination (Vitamin B2)

Compositions (Formulation Examples M11 to M14) having the compositions shown in Table 8 were produced by a conventional production process. Each Formulation Example contained vitamin B2 (riboflavin), which is a UV wavelength conversion substance, and it was found that vitamin B2 functioned as a wavelength conversion substance in each Formulation Example. Formulation Examples M11 to M14 had fluorescence integrated values of 2563, 2878, 3281, and 2859, respectively, and it was found that the wavelength conversion function of the vitamin B2 was enhanced by the combination of lauryl PEG-9 polydimethylsiloxy ethyl dimethicone or PEG-9 polydimethylsiloxy ethyl dimethicone with the dispersant PEG-10 dimethicone as compared to PEG-10 dimethicone alone.

TABLE 7

| | Formulation composition | Formulation Example P1 | Formulation Example P2 | Formulation Example P3 | Formulation Example P4 | Formulation Example P5 | Formulation Example P6 | Formulation Example P7 |
|---|---|---|---|---|---|---|---|---|
| Water | water | Total amount of 100 with water | | | | | | |
| Alcohol | ethanol | 5 | 5 | 5 | 5 | 5 | 5 | 5 |
| Moisturizing agent | glycerin | 2 | 2 | 2 | 2 | 2 | 2 | 2 |
| | dipropylene glycol | 3 | 3 | 3 | 3 | 3 | 3 | 3 |
| Clay minerals | dimethyldistearylammonium hectorite | 0.2 | 0.2 | 0.2 | 0.2 | 0.2 | 0.2 | 0.2 |
| Dispersant | lauryl PEG-9 polydimethylpolysiloxyethyl dimethicone | 3 | 3 | 3 | 3 | 3 | 3 | 3 |
| | PEG-10 dimethicone | 3 | 3 | 3 | 3 | 3 | 3 | 3 |
| Oil content | dimethicone | 15 | 15 | 15 | 15 | 15 | 15 | 15 |
| | isododecane | 10 | 10 | 10 | 10 | 10 | 10 | 10 |
| | PBG/PPG-9/1copolymer | 1 | 1 | 1 | 1 | 1 | 1 | 1 |
| | octyl palmitate | 3 | 3 | 3 | 3 | 3 | 3 | 3 |
| | diisopropyl sebacate | 5 | | | | | | |
| UV absorber | octocrylene | 3 | 3 | 3 | 3 | 3 | 3 | 3 |
| | ethylhexyl salicylate | 5 | 5 | 5 | 5 | 5 | 5 | 5 |
| | homosalate | 5 | 5 | 5 | 5 | 5 | 5 | 5 |
| UV scattering agent | fine particulate zinc oxide | 1 | 1 | 1 | 1 | 1 | 1 | 1 |
| Phosphor | zinc oxide phosphor | 5 | 5 | 5 | 5 | 5 | 5 | 5 |
| Powder | polymethyl methacrylate | | 5 | | | | | |
| | crosslinked silicone/network-type silicone block copolymer | | | 5 | | | | |
| | silica | | | | 5 | | | |
| | hydrophobized talc | | | | | 5 | | |
| | cornstarch | | | | | | 5 | |
| | hydrophobized polyurethane | | | | | | | 5 |
| Chelating agent | chelating agent | q.s. | q.s. | q.s. | q.s. | q.s. | q.s. | q.s. |
| Preservative | preservative | q.s. | q.s. | q.s. | q.s. | q.s. | q.s. | q.s. |
| Fragrance | fragrance | q.s. | q.s. | q.s. | q.s. | q.s. | q.s. | q.s. |
| | fluorescence integrated value | 19133 | 21805 | 19486 | 23191 | 21689 | 21788 | 22552 |

TABLE 8

| | Formulation composition | Formulation Example M11 | Formulation Example M12 | Formulation Example M13 | Formulation Example M14 |
|---|---|---|---|---|---|
| Water | water | | Total amount of 100 with water | | |
| Alcohol | ethanol | 5 | 5 | 5 | 5 |
| Moisturizing agent | glycerin | 2 | 2 | 2 | 2 |
| | dipropylene glycol | 3 | 3 | 3 | 3 |
| Clay minerals | dimethyldistearylammonium hectorite | 0.2 | 0.2 | 0.2 | 0.2 |
| Dispersant | PEG-10 dimethicone | 1 | 1 | 1 | 1 |
| | lauryl PEG-9 polydimethylpolysiloxyethyl dimethicone | | 0.5 | 2 | |
| | PEG-9 polydimethylpolysiloxyethyl dimethicone | | | | 2 |
| Oil content | dimethicone | 10 | 10 | 10 | 10 |
| | isododecane | 10 | 10 | 10 | 10 |
| | PBG/PPG-9/1copolymer | 2 | 2 | 2 | 2 |
| | octyl palmitate | 3 | 3 | 3 | 3 |
| UV absorber | octocrylene | 3 | 3 | 3 | 3 |
| | ethylhexyl salicylate | 5 | 5 | 5 | 5 |
| | homosalate | 5 | 5 | 5 | 5 |
| UV scattering agent | fine particulate zinc oxide | 10 | 10 | 10 | 10 |
| Phosphor | vitamin B2 | 0.01 | 0.01 | 0.01 | 0.01 |
| Powder | silica | 2 | 2 | 2 | 2 |
| | hydrophobized talc | 2 | 2 | 2 | 2 |
| Chelating agent | chelating agent | q.s. | q.s. | q.s. | q.s. |
| Preservative | preservative | q.s. | q.s. | q.s. | q.s. |
| Fragrance | fragrance | q.s. | q.s. | q.s. | q.s. |
| | fluorescence integrated value | 2563 | 2878 | 3281 | 2859 |

Example 12: Effect on Cytochrome c Content

In Examples 1 to 3, it was found that in the AlamarBlue assays, wavelength-converted visible light enhanced the reducing ability by electron acceptance from the mitochondrial respiratory chain in cells. Cytochrome c is a molecule involved in the electron transport system of mitochondria, and plays an important function in the production of NDH molecules, which are a reducing agent. Thus, whether the composition of the present invention influences the intracellular concentration of cytochrome c in cells was investigated.

The composition of the present invention was applied and dispensed at 0.1 g/well to a 24-well plate and dried. Human skin-derived fibroblasts (ScienCell Research Lab. #2320) were seeded on a 24-well plate at $1 \times 10^5$ cells/well and cultured in a DMEM medium (Thermo Fisher, #11965-092) for 3 days. After washing the cells with PBS, 1 mL of PBS was added. The 24-well plate containing the dried composition was placed on a 24-well plate containing cells, and irradiated with artificial sunlight (Selic Corporation, XC-500BF) at a maximum output power for 40 minutes at a distance of about 70 cm apart. All the cell plates were placed on a heat storage material at 20° C. to prevent temperature rise. After the irradiation time elapsed, the PBS was removed, 0.3 mL of a cell-extract solution (RIPA buffer: 50 mM Tris-HCl (pH 8.0), 150 mM NaCl, 0.5% (w/v) Sodium Deoxycholate, 0.1% (w/v) SDS, 1.0% (w/v) NP-40 substitute, and 1 mM PMSF) was added, and the cells were completely lysed by pipetting. The lysate was centrifuged at 10,000×g for 10 minutes at 4° C., and cytochrome c in the supernatant was measured (Proteintech Group, Inc., KE00079).

There was no effect on the appearance of the cells before and after sunlight irradiation. The content of cytochrome c in cells without the composition was 3782 pg/mL, whereas the contents of cytochrome c in Formulation Examples M4 and M5 exhibiting a high ultraviolet wave-conversion function were 5150 pg/mL and 5448 pg/mL, respectively, indicating that the amount of cytochrome c in the cells was increased.

From the above results, it was considered that the investigated composition was suitable for exhibiting the function of the UV wavelength conversion substance, and activates cells by increasing the concentration of cytochrome c in cells and increasing the activity of mitochondria.

As an example of the composition of the present invention, the following composition shown in Table 9 can be formulated.

TABLE 9

| Formulation composition | Content (mass %) |
|---|---|
| Purified water | Total amount of 100 with water |
| Ethanol | 10 |
| Edta•3na | 0.1 |
| Sodium chloride | 0.1 |
| Sodium pyrosulfite | 0.01 |
| Glycerin | 2 |
| Xylitol | 1 |
| Tormentilla extract | 1 |
| Sodium hyaluronate | 0.1 |
| 2-O-ethyl-L-ascorbic acid | 0.1 |
| Dipotassium glycyrrhizinate | 0.05 |
| Isododecane | 5 |
| Isopropyl myristate | 3 |
| Diisopropyl sebacate | 10 |
| PBG/PPG-9/1copolymer | 1 |
| Dimethicone (1.5 cs) | 8 |
| Dimethicone (6 cs) | 2 |
| Cyclopentasiloxane solution with 50% trisiloxysilicic acid | 2 |
| Octocrylene | 5 |
| Hexyl diethylaminohydroxybenzoyl benzoate | 1 |
| Bis(ethylhexyloxyphenol)methoxyphenyl triazine | 0.8 |
| Ethylhexyl salicylate | 5 |
| Homosalate | 3 |
| Fine particulate titanium oxide (particle size 15 nm) treated with stearic acid/Al hydroxide | 3 |

TABLE 9-continued

| Formulation composition | Content (mass %) |
|---|---|
| Fine particulate zinc oxide treated with distearyldimethylammonium chloride | 7 |
| Zinc oxide phosphor | 5 |
| Silica | 3 |
| Carnauba wax powder | 3 |
| PEG-9 polydimethylpolysiloxyethyl dimethicone | 1 |
| Cetyl PEG/PPG-10/1dimethicone | 1 |
| Dimethyldistearylammonium hectorite | 0.2 |
| Isostearic acid | 0.1 |
| tocopherol | 0.01 |
| fragrance | q.s. |

The composition of the present invention is described above. However, the present invention is not limited thereto, and can be modified as appropriate without departing from the spirit of the invention.

The invention claimed is:

1. A composition comprising:
(A) a UV wavelength conversion substance,
(B) a dispersant,
(C) a UV absorber and/or a UV scattering agent, and
(D) an oil component,
wherein the (A) UV wavelength conversion substance comprises one or more selected from the group consisting of a zinc oxide phosphor, a magnesium titanate phosphor, phycocyanin, phycoerythrocyanin, phycoerythrin, vitamin K, vitamin B1, vitamin B2, vitamin B2 derivatives, vitamin B6, vitamin B12, and folic acid,
wherein the (B) dispersant comprises a combination of PEG-10 dimethicone and one or more dispersants selected from the group consisting of bis-butyldimethicone polyglyceryl-3, PEG-9 polydimethylsiloxyethyl dimethicone, lauryl PEG-9 polydimethylsiloxyethyl dimethicone, cetyl PEG/PPG-10/1 dimethicone, isostearic acid, and carboxydecyl trisiloxane,
wherein the blending amount of the (B) dispersant is 1% by weight or more relative to the total of the composition.

2. The composition according to claim 1, wherein the (A) UV wavelength conversion substance comprises a zinc oxide phosphor and/or a magnesium titanate phosphor.

3. The composition according to claim 1, wherein the (A) UV wavelength conversion substance comprises one or more selected from the group consisting of phycocyanin, phycoerythrocyanin, phycoerythrin, vitamin K, vitamin B1, vitamin B2, vitamin B2 derivatives, vitamin B6, vitamin B12, and folic acid.

4. The composition according to claim 1, comprising a zinc oxide phosphor and/or a magnesium titanate phosphor, and one or more selected from the group consisting of phycocyanin, phycoerythrocyanin, phycoerythrin, vitamin K, vitamin B1, vitamin B2, vitamin B2 derivatives, vitamin B6, vitamin B12, and folic acid.

5. The composition according to claim 1, comprising one or more powders selected from the group consisting of polymethyl methacrylate, silica, talc, starch, and polyurethane.

6. The composition according to claim 1, which is a water-in-oil type composition.

7. The composition according to claim 1, which is a sunscreen cosmetic.

8. The composition according to claim 1, which exhibits a fluorescence intensity increasing effect.

9. The composition according to claim 1, which exhibits a cell activation effect.

* * * * *